US012282962B1

(12) United States Patent
Bitragunta

(10) Patent No.: US 12,282,962 B1
(45) Date of Patent: Apr. 22, 2025

(54) DISTRIBUTED LEDGER FOR RETIREMENT PLAN INTRA-PLAN PARTICIPANT TRANSACTIONS

(71) Applicant: Wells Fargo Bank, N.A., San Francisco, CA (US)

(72) Inventor: Padmavathy Bitragunta, Bengaluru (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 219 days.

(21) Appl. No.: 17/805,800

(22) Filed: Jun. 7, 2022

(51) Int. Cl.
*G06Q 40/06* (2012.01)
*G06Q 20/02* (2012.01)
*G06Q 20/04* (2012.01)
*G06Q 40/02* (2023.01)

(52) U.S. Cl.
CPC ............ *G06Q 40/06* (2013.01); *G06Q 20/02* (2013.01); *G06Q 20/04* (2013.01); *G06Q 40/02* (2013.01)

(58) Field of Classification Search
None
See application file for complete search history.

(56) References Cited

U.S. PATENT DOCUMENTS 10,637,644 B1 4/2020 Walters et al.
10,713,677 B2 7/2020 Ziedan et al.
10,783,590 B1 * 9/2020 Zhou ........................ H04L 9/50
10,949,837 B1 3/2021 Ramanathan
10,965,446 B2 3/2021 Ramasamy et al.
11,017,391 B1 5/2021 Winklevoss et al.
11,030,681 B2 6/2021 Bathen et al.
11,075,757 B2 7/2021 Schiatti et al.
11,250,422 B1 2/2022 Hayes et al.
2015/0206106 A1 7/2015 Yago
2018/0240192 A1 * 8/2018 Castineiras ........... G06Q 40/06
2018/0315143 A1 11/2018 Rang et al.
2019/0026730 A1 1/2019 Moy et al.
(Continued)

FOREIGN PATENT DOCUMENTS

CN 111724264 9/2020
CN 113298662 8/2021
(Continued)

OTHER PUBLICATIONS

Muis, J. (2018) An individualized Tontine pension on the blockchain : a blockchain enabled way of sharing longevity risk. (Year: 2018).*
(Continued)

*Primary Examiner* — Andrew B Whitaker
(74) *Attorney, Agent, or Firm* — SCHWEGMAN LUNDBERG & WOESSNER, P.A.

(57) ABSTRACT

Various examples are directed to systems and methods for administering transactions between plan participants in a retirement plan. A group management system may use public verification keys for the set of plan participants to monitor transactions involving the set of plan participants at a retirement plan distributed ledger and detect a trigger condition for a first plan participant of the set of plan participants. The group management system may generate an intra-group transaction, generate a transaction record describing the intra-group transaction, and broadcast the transaction record to be included in the retirement plan distributed ledger.

20 Claims, 15 Drawing Sheets

(56) References Cited

U.S. PATENT DOCUMENTS

| | | | | |
|---|---|---|---|---|
| 2019/0081789 | A1* | 3/2019 | Madisetti | H04L 9/0637 |
| 2019/0130399 | A1 | 5/2019 | Wright et al. | |
| 2019/0197622 | A1 | 6/2019 | Molinari et al. | |
| 2019/0228409 | A1* | 7/2019 | Madisetti | G06Q 40/03 |
| 2019/0251629 | A1 | 8/2019 | Gordon, III et al. | |
| 2020/0118094 | A1 | 4/2020 | Haldenby et al. | |
| 2020/0250752 | A1 | 8/2020 | Sugarman | |
| 2020/0258061 | A1 | 8/2020 | Beadles et al. | |
| 2020/0265511 | A1 | 8/2020 | Silveira et al. | |
| 2020/0311816 | A1 | 10/2020 | Calvin | |
| 2020/0387967 | A1 | 12/2020 | Cella | |
| 2021/0056638 | A1* | 2/2021 | Davis | G06Q 20/102 |
| 2021/0166312 | A1 | 6/2021 | Dakshi et al. | |
| 2021/0241918 | A1 | 8/2021 | Kutzko et al. | |
| 2021/0344507 | A1 | 11/2021 | Peng | |
| 2021/0374861 | A1* | 12/2021 | McClelland | G06Q 20/40145 |
| 2021/0406999 | A1 | 12/2021 | Jorji et al. | |

FOREIGN PATENT DOCUMENTS

| | | | |
|---|---|---|---|
| JP | 2019511150 | * | 4/2019 |
| JP | 2019511150 A | * | 4/2019 |
| KR | 20170099043 | | 8/2017 |
| WO | 2020104961 | | 5/2020 |
| WO | 2020157711 | | 8/2020 |
| WO | 2021211131 | | 10/2021 |
| WO | WO-2022234137 A2 | | 11/2022 |

OTHER PUBLICATIONS

Arora, Nisha, "Blockchain Empowered Framework for Peer to Peer Lending", 2021 9th International Conference on Reliability, Infocom Technologies and Optimization (Trends and Future Directions) (ICRITO), (2021), 5 pgs.

Beck, Roman, "3.7 Autonomous pension funds on the blockchain", begins on p. 121 [Online]. Retrieved from the Internet: URL: http: dagstuhl.sunsite.rwth-aachen.de volltexte 2017 7363 pdf dagrep_v007_i003_p099_s17132.pdf#page=23, (Mar. 16, 2022), 44 pgs.

"U.S. Appl. No. 17/805,798, Non Final Office Action mailed Mar. 26, 2024", 13 pgs.

"U.S. Appl. No. 17/805,798, Response filed Jun. 14, 2024 to Non Final Office Action mailed Mar. 26, 2024", 13 pgs.

"U.S. Appl. No. 17/805,798, Final Office Action mailed Aug. 21, 2024", 15 pgs.

U.S. Appl. No. 17/805,798, filed Jun. 7, 2022, Retirement Plan Processing Using Distributed Ledger.

* cited by examiner 900
126
TRANSACTION POOL
TRANSACTIONS
110
PLAN SPONSOR 1
108
113
ASSET MANAGER SYSTEM
112
MINER SYS.
116
MINER SYS.
118
BLOCKS
124
DL
122
TR
102
App
104
106
904
UI
GROUP MANAGEMENT SYSTEM
902
906
APP
910
908
916
914
912
120
ID MANAGEMENT

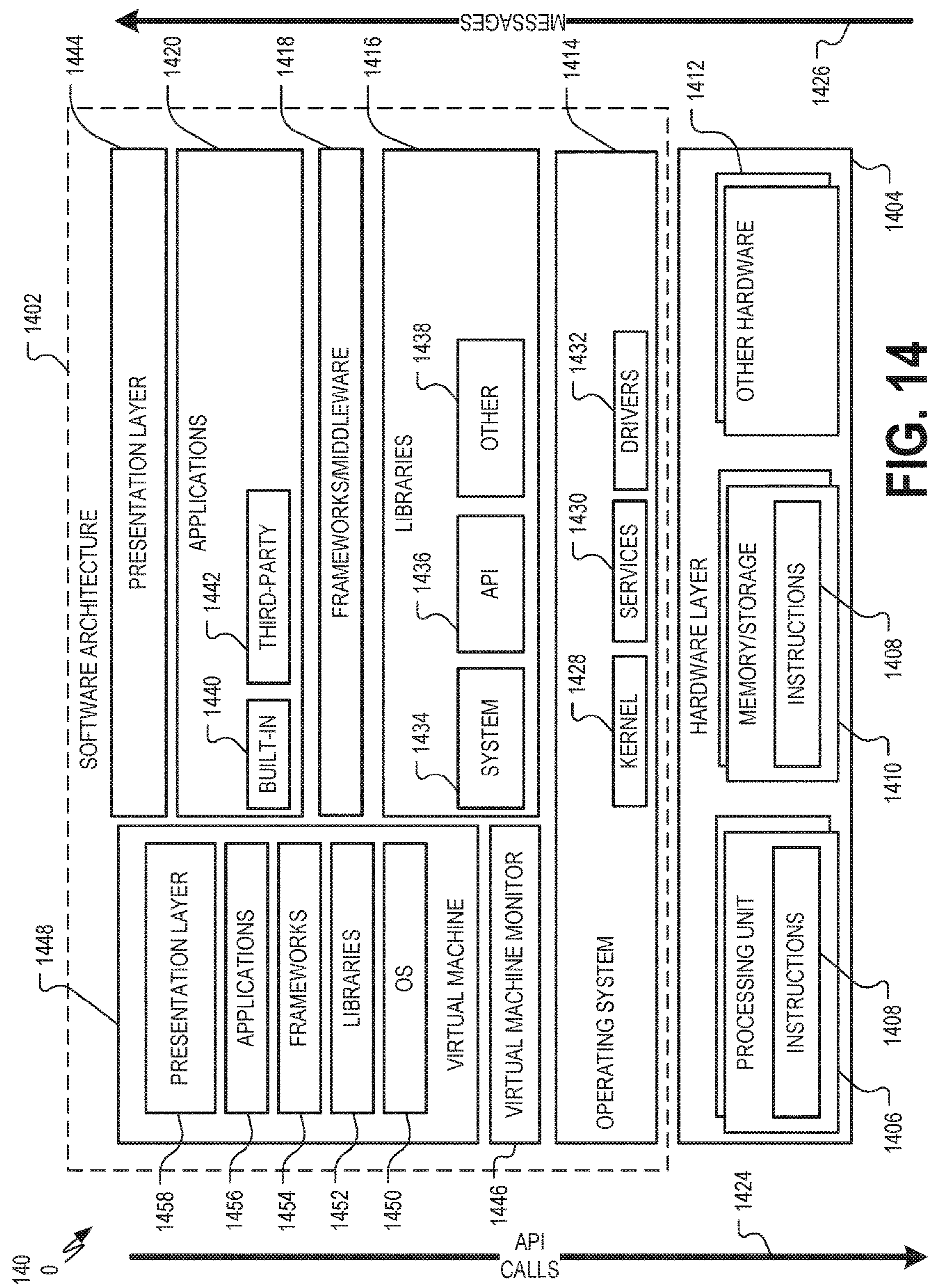
MESSAGES
1426
1444
1420
1418
1416
1414
1412
1402
1404
SOFTWARE ARCHITECTURE
PRESENTATION LAYER
APPLICATIONS
BUILT-IN
1440
THIRD-PARTY
1442
FRAMEWORKS/MIDDLEWARE
LIBRARIES
SYSTEM
1434
API
1436
OTHER
1438
KERNEL
1428
SERVICES
1430
DRIVERS
1432
OTHER HARDWARE
HARDWARE LAYER
MEMORY/STORAGE
INSTRUCTIONS
1408
1410
1448
PRESENTATION LAYER
APPLICATIONS
FRAMEWORKS
LIBRARIES
OS
VIRTUAL MACHINE
VIRTUAL MACHINE MONITOR
OPERATING SYSTEM
PROCESSING UNIT
INSTRUCTIONS
1408
1406
1458
1456
1454
1452
1450
1446
1424
1400
API CALLS
FIG. 14

DISTRIBUTED LEDGER FOR RETIREMENT PLAN INTRA-PLAN PARTICIPANT TRANSACTIONS

BACKGROUND

Some financial institutions act as asset managers for retirement plans, such as Individual Retirement Accounts (IRAs), accounts under 25 U.S.C. § 401(k) ("401(k) accounts"), and the like. Plan participants in a retirement plan are individuals who own accounts in the plan. Some retirement plans are set up and managed by a plan sponsor that can be an employer of the plan participants. The financial institution acting as the asset manager may manage transactions on the plan participants' accounts.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

FIG. 14 is a block diagram showing one example of a software architecture for a computing device.

DETAILED DESCRIPTION

Figure 1:
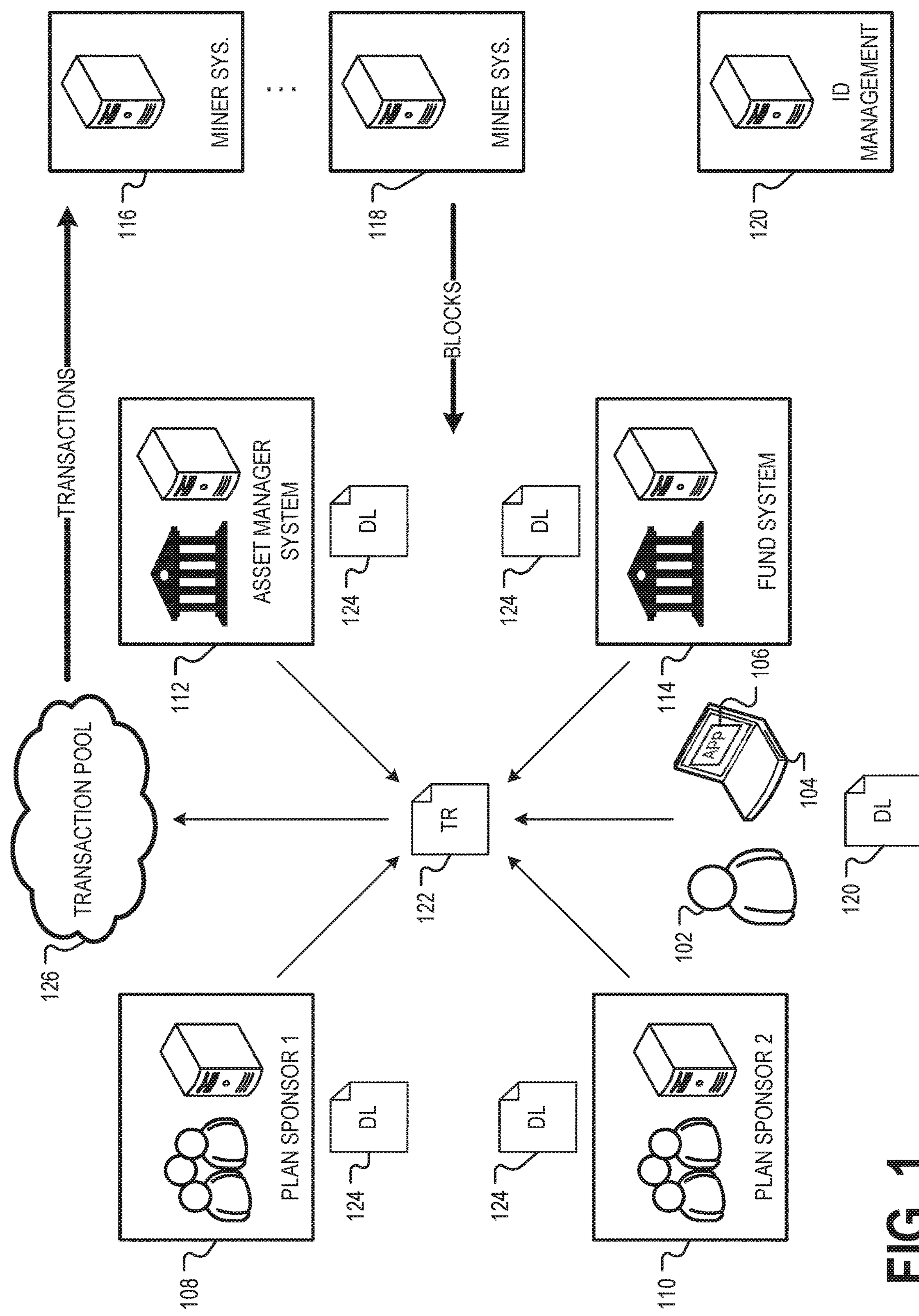
FIG. 1 is a diagram showing one example of an environment for administering retirement plan transactions.

In some examples, retirement plans are characterized by limited contact between plan participants and other parties involved in the retirement plan, such as, for example, the plan sponsor and/or the asset manager. For example, plan participants may not typically manage accounts in a retirement plan as regularly as other accounts. Therefore, a plan participant may not contact the financial institution acting as asset manager for his or her retirement plan accounts as frequently as the plan participant contacts, for example, the financial institution holding the plan participant's checking or credit card accounts. Also, many retirement plans are sponsored by employers. In these cases, contact information for the plan participant is often provided to the asset manager indirectly by the plan participant's employer acting as the plan sponsor. This can make it challenging for the various parties to the retirement plan to obtain and maintain correct, current contact information for plan participants and appropriate records.

Additional complications arise when a plan participant changes employers, leaving behind a retirement plan sponsored by the now former employer. For example, an individual is typically not in regular contact with a previous employer, meaning that a plan sponsor may not be provided with updated identity information for plan participants who have moved on to other employers. Also, when a plan participant moves to a new employer, the plan participant may open a new account in a new retirement plan sponsored by the new employer. As a result, a single plan participant may have multiple accounts in different retirement plans having different plan sponsors and or asset managers.

This situation leads to various difficulties and risks. For example, an asset manager or plan sponsor who has not been in recent contact with a plan participant may lack current contact data for plan participants and may have difficulty contacting the plan participants to verify requested transactions. This may make it easier for malicious actors to impersonate plan participants to convert plan participant funds and more difficult for plan sponsors and/or asset managers to detect this kind of fraud.

Computing technology can be used to mitigate some of the challenges of retirement account management. For example, plan sponsors and/or asset managers may maintain computing systems that track transactions against plan participants' accounts using identifiers for the plan participants, such as Social Security numbers and the like. Such computing systems may store and track account transactions using database processing and/or similar computing technologies.

Using traditional computing technologies, such as database processing, to track transactions on retirement plan accounts, however, still raises considerable challenges. For example, a database is typically implemented by a single party (e.g., a single plan sponsor or asset manager). Accordingly, data not available to the single party may not be stored at the database. If a plan participant moves to a new employer, for example, a database implemented by the previous employer/plan sponsor may no longer receive updated information about the plan participant.

In some examples, one could solve some of the problems associated with administering retirement plans by implementing a central database that is accessible by multiple parties. Multiple plan sponsors, asset managers, and/or the like would access data stored at the central database. In this way, transactions against retirement plan accounts and/or updated information for plan participants could be stored at a single, central location. Implementing a central database, however, may be expensive. A party implementing a central database would need to be compensated. Also, a central database may raise concerns related to authentication and security. For example, the central database system may need to authenticate all of the various plan participants, asset managers, plan sponsors, and other parties that may seek to create and/or read records at the database.

Various examples address these and other difficulties by using the computing systems of various retirement plan parties to implement a specialized distributed ledger, for example, in conjunction with an identity management system. A distributed ledger is a record of transactions that is maintained by multiple computing systems that are often geographically distributed. The multiple computing systems maintain copies of the distributed ledger. New transaction records are added to the distributed ledger by consensus of the parties, for example, as described herein. This may lessen the risk of fraudulent transactions without the expense and challenges of a centralized database system.

Parties to the distributed ledger may authenticate themselves using a public/private key pair, as described herein. For example, a computing system that is a party to the distributed ledger may digitally sign a transaction record by executing a cryptographic function, such as a hash function. The cryptographic function is executed using the transaction record and the creating party's private key. Any suitable cryptographic function may be used such as, for example, SHA256 and/or a similar function. The result of the cryptographic function may be referred to as a digital signature. Any other party may verify the transaction record using the transaction record, the creating party's digital signature and the creating party's public verification key. This may verify that the creating party was the party who digitally signed the transaction record.

Digitally signed transaction records may be broadcast to all parties to the distributed ledger for incorporation in the distributed ledger, either as stand-alone blocks of the distributed ledger and/or as part of a group of transactions included in common block to the distributed ledger. Each block may include a reference to the digital signature of the prior block such that a digital signature of a block is tied to the content of the prior block. In this way, the authenticity and order of the transactions may be maintained.

In the context of retirement plan management, a distributed ledger may be used by plan sponsor systems, asset manager systems, plan participant computing devices, and the like to track transactions made by plan participants against their accounts in various retirement plans. Tracked transactions may include, for example, plan account openings, contribution transactions that contribute to a plan participant's account, withdrawal transactions in which a plan participant liquidates some or all of a plan account, loan transactions in which a plan participant takes a loan against a retirement plan account, and the like.

In various examples, an identity management system may be used to adapt a distributed ledger to a retirement plan tracking implementation. The identity management system may track the identity of the various parties using the distributed ledger for managing retirement plans. For example, a plan participant, when opening an account, may establish an identity with the identity management system. The identity management system may associate a plan participant's identity with the plan participant's public verification key. For example, when the plan participant opens a retirement plan account, the plan sponsor, asset manager, or other party may query the identity management system to determine a public verification key for the plan participant. If the plan participant is not known to the identity management system, it may generate a public/private key pair for the plan participant and/or prompt the plan participant to generate a public/private key pair and provide the public verification key to the identity management system. If the plan participant is already known to the identity management system, the identity management system may provide or otherwise verify a previously generated public verification key. The previously generated public verification key may be used for subsequent transactions involving the plan participant.

In this way, the distributed ledger may be used to track transactions involving a particular plan participant, including transactions across multiple accounts in different retirement plans. In various examples, however, the use of the distributed ledger and/or identity management system may simplify record keeping as compared to other solutions, such as central database systems. For example, it may be simpler and less expensive to implement an identity management system than it is to implement a single centrally accessible database and manage authentication and access for many different parties. A distributed ledger, as described herein, may also manage security in a distributed manner, without the need to set-up (and compensate) a central authority to verify the authenticity of each transaction at the time that the transaction is recorded.

FIG. 1 is a diagram showing one example of an environment 100 for administering retirement plan transactions. The environment 100 shows a plan participant 102, plan sponsor systems 108, 110, an asset manager system 112, and a fund system 114. It will be appreciated that various implementations of the environment 100 may include more or fewer systems than are shown in FIG. 1. For example, the environment 100 may include more than two plan sponsor systems, more than one asset manager system, more than one fund system, as well as multiple plan participants.

In this example, the plan participant 102 accesses other portions of the environment 100 using a plan participant computing device 104. The plan participant computing device 104 may be any suitable computing device or devices such as, for example, a smart phone, a tablet computer, a laptop computer, a smart watch, and the like. The plan participant computing device 104 may comprise input/output (I/O) devices for providing a user interface (UI) to the plan participant 102. In some examples, plan participant computing device 104 executes an application 106 that facilitates interaction with the other components of the environment 100. In some examples, the application 106 is a web browser that communicates with one or more of the other systems 108, 110, 112, 116, 118, 120 of the environment 100 via a web server or similar arrangement.

Plan sponsor systems 108, 110 may be implemented by entities that sponsor retirement plans such as, for example, IRA plans, 401(k) plans, and the like. A plan sponsor may be, for example, an employer of plan participants, such as the plan participant 102. The plan sponsor systems 108, 110 may comprise one or more computing devices, such as servers and/or the like. A single plan sponsor system 108, 110 may be implemented at a single geographic location and/or across multiple geographic locations. In some examples, a plan sponsor may implement a plan sponsor system 108, 110 in whole or in part using a cloud deployment such as according to an infrastructure as a service (IaaS), platform as a service (PaaS) or similar arrangement.

The asset manager system 112 may be implemented by an entity that acts as an asset manager for one or more retirement plans. For example, the asset manager entity may act as a broker and/or otherwise manage the purchase and/or sale of assets held in retirement plan accounts of the plan participant 102 and other plan participants. In one example transaction, the plan participant 102 and/or the plan sponsor may contribute to the plan participant's retirement plan accounts. Funds for the contribution may be provided to the asset manager system 112, which may implement an asset purchase to perfect the contribution. In other example transactions, the plan participant 102 may take a distribution and/or loan against his or her retirement plan account. The asset manager system 112 may implement an asset sale from the plan participant's account and provide the proceeds to the plan participant.

The asset manager system 112 may comprise one or more computing devices, such as servers and/or the like. The asset manager system 112 may be implemented at a single geographic location and/or across multiple geographic locations. In some examples, a plan sponsor may implement an asset manager system 112 in whole or in part using a cloud deployment such as according to an IaaS, PaaS, or similar arrangement. Also, although only one asset manager system 112 is shown in FIG. 1, it will be appreciated that the distributed ledger 124, as described herein, may be used by multiple different asset manager systems 112 implemented by multiple different asset managers.

The fund system 114 may be implemented by a fund manager entity. A fund manager entity is responsible for a managed asset that may be held in retirement plan accounts. For example, the fund entity may manage a mutual fund, bond fund, Real Estate Investment Trust (REIT) or other asset type. A fund system 114 may execute asset purchases and/or sales in response to instructions from an asset manager system, such as the asset manager system 112.

The fund system 114 may comprise one or more computing devices, such as servers and/or the like. The fund system 114 may be implemented at a single geographic location and/or across multiple geographic locations. In some examples, a plan sponsor may implement a fund system 114 in whole or in part using a cloud deployment such as according to an IaaS, PaaS, or similar arrangement. Also, although only one fund system 114 is shown in FIG. 1, it will be appreciated that the distributed ledger 124, as described herein, may be used by multiple different asset manager systems 112 implemented by multiple different asset managers.

Retirement plan account transactions in the environment 100 may be recorded at the distributed ledger 124. A party to a retirement plan such as, for example, the plan participant 102, a plan sponsor system 108, 110, the asset manager system 112, the fund system 114 and/or the like may initiate a transaction. The party may generate a transaction record 122. The transaction record 122 may include a description of the transaction and a public verification key of the plan participant. The generating party may then provide a digital signature of the transaction record 122. In some examples, the digital signature is generated considering data from a prior transaction at the distributed ledger 124 so as to set a transaction order. After digitally signing the transaction record 122, the generating party may broadcast the transaction record 122 to the systems maintaining a copy of the distributed ledger.

In some examples, broadcasting the transaction record 122 includes providing the transaction record 122 to a transaction pool 126. The transaction pool 126 may be maintained by one or more of the systems 108, 110, 112, 114, and/or devices 104 that are parties to the distributed ledger 124 and/or may be implemented by one or more other systems, such as by one or more miner systems 116, 118. In some examples, broadcasting may be performed utilizing a broadcasting circuit. The broadcasting circuit may be a component of the system 108, 110, 112, 114, 116, 118, 120 performing the broadcast and may be used by the respective system to communicate the transaction record 122 or other data to other respective systems. In some examples, a broadcasting circuit includes a network interface device or other similar suitable hardware.

Miner systems 116, 118 may generate blocks for the distributed ledger 124 using transactions from the transaction pool 126. Miner systems 116, 118 may be implemented by parties who perform work on the distributed ledger 124, for example, as described herein. A miner system 116, 118 may include any suitable computing device or devices such as, for example, one or more desktop computers, one or more laptop computers, one or more servers, and the like. In some examples, a miner system 116, 118 includes specialized hardware for quickly performing cryptographic functions such as, for example, high speed graphics cards, an Application Specific Integrated Circuit (ASIC) optimized for cryptographic operations, and/or the like.

A block generated by a miner system 116, 118 may include transaction records 122 for a set of transactions made by various parties to the distributed ledger 124 (e.g., a predetermined number of transaction). A miner system 116, 118 may digitally sign the block of transaction records. In some examples, the miner system's digital signature may be determined based on content from a prior block at the distributed ledger 124 (e.g., the most recent block added to the distributed ledger 124).

In addition to digitally signing a block, the miner systems 116, 118 may generate a proof-of-work for the block. The proof-of-work for the block may involve performing a cryptographic operation that takes time to complete. In some examples, the proof-of-work may involve adding nonce data to all or a portion of the block such that the digital signature of the block has a predetermined property (e.g., a predetermined number of leading zeros, and/or the like). It may not be practical to deterministically generate the proof-of-work, so the miner systems 116, 118 may repeatedly test nonce data with the cryptographic function used to generate the digital signature until nonce data is found that, when used with the cryptographic function of the digital signature, generates a digital signature having the predetermined properties.

The first miner system 116, 118 to generate a digital signature having the predetermined properties may broadcast its block, including the digital signature or other proof-of-work, to the parties to the distributed ledger 124. The parties may add the newly received block to the distributed ledger 124. In some examples, the distributed ledger 124 may be implemented with rules for resolving block conflicts. For example, if two miner systems 116, 118 solve a block at or near the same time, some of the parties to the distributed ledger 124 may first receive a new block generated by miner system 116 while other parties may first receive a new block generated by miner system 118. In such a case, for example, the parties to the distributed ledger 124 may accept as accurate the block chain branch having the most blocks.

A miner system 116, 118 that successfully generates a block may be compensated by the other parties to the distributed ledger 124. For example, the parties who requested the transaction records included in a block may pay a transaction charge to the miner system 116, 118 when a block is completed.

When the plan participant 102 desires to make a withdrawal, loan, or other distribution from a retirement plan account, the plan participant 102 may retrieve transactions records from the distributed ledger 124 that describe contributions made to the plan participant's retirement plan account by the plan participant 102, a plan sponsor system 108, 110, or another party. These transaction records may indicate the public verification key of the plan participant 102. The plan participant 102 may digitally sign the previous transactions records using the private key of the plan participant 102. In this way, other parties to the withdrawal transaction may be able to verify that the plan participant 102 requesting the distribution is in possession of the private key indicated by the referenced contribution transaction records.

In various examples, an identity management system 120 may be used to track the identity of plan participants, such as the plan participant 102, and/or other parties to the distributed ledger 124. The identity management system 120 may be implemented using any suitable computing device or devices such as, for example, one or more services at a single location and/or distributed at multiple geographic locations. The identity management system 120 may be implemented using an on-premise arrangement and/or using a cloud deployment such as according to IaaS, PaaS, or a similar arrangement.

The identity management system 120 manages the identities of various parties using the distributed ledger 124 including plan participants, such as the plan participant 102 (and other plan participants not shown in FIG. 1). In some examples, the identity management system 120 may manage identities of other parties, such as plan sponsors implementing plan sponsor systems 108, 110, asset manager entities implementing asset manager systems such as the asset manager system 112, fund manager entities implementing fund systems, such as the fund system 114, and the like.

A plan participant, such as the plan participant 102, may prove his or her identity to the identity management system 120, for example, by providing identifying information to the identity management system 120 and/or an identity management entity associated with the identity management system 120. For example, the identity management system 120 may include a web server that the plan participant 102 may access via the application 106. Identifying information provided by a plan participant to the identity management system 120 may include, for example, a name, previous names, an address, a Social Security number or other government identification number, a date of birth, etc. In some examples, a plan participant, such as a plan participant 102, may provide documents to the identity management system 120 such as, for example, a birth certificate, a Social Security card, driver's license, or other government-issued identification. In some examples, a plan participant provides the identity management system 120 (and/or the implementing identity management entity) with hard copies of one or more identity-proving documents.

When the plan participant 102 has proven his or her identity to the identity management system 120, the identity management system 120 may store a public verification key for the plan participant 102. In some examples, the plan participant 102 generates the public verification key and provides it to the identity management system 120, which may store the public verification key. In other examples, the identity management system 120 may generate a public/private key pair for the plan participant 102 and store the public verification key in association with identity information describing the plan participant 102.

The plan participant 102 may open a retirement plan account managed by plan sponsor system 108. For example, plan sponsor system 108 may be implemented by an employer of the plan participant 102. The plan participant 102 may provide identifying information to the plan sponsor system 108, for example, via a user interface provided by the application 106 at the plan participant computing device 104. The plan sponsor system 108 may provide the plan participant identifying information to the identity management system 120.

The identity management system 120 may determine whether it has stored identity information for the plan participant 102 previously. For example, if the plan participant 102 has a retirement plan account opened through a different plan sponsor, then the identity management system 120 may already have a public verification key stored for the plan participant 102. If the identity management system 120 already has a public verification key stored in association with the plan participant 102, the identity management system 120 may provide the public verification key to the plan sponsor system 108. The plan sponsor system 108 may use the public verification key for transactions involving the plan participant 102. If the identity management system 120 does not have a public verification key stored in association with the plan participant 102, the plan participant 102 may be prompted to generate and/or store a public verification key at the identity management system 120, as described herein. The identity management system 120 may provide the public verification key to the plan sponsor system 108, which may use the public verification key for transactions involving the plan participant 102.

In some examples, other systems may also use the identity management system 120 to receive a public verification key for the plan participant 102. For example, the asset manager system 112, upon receiving a transaction request from the plan participant 102 and/or a plan sponsor system 108, 110, may query the identity management system 120 to receive and/or verify the public verification key of the plan participant 102.

Consider an example in which the plan participant 102 leaves the employment of the entity implementing the plan sponsor system 108 and takes a new job position with a new employer implementing the plan sponsor system 110. The plan participant 102 may open a new retirement plan account through the plan sponsor system 110. The plan participant 102 may provide the plan sponsor system 110 with identifying information, as described herein. The plan sponsor system 110 may query the identity management system 120 to receive and/or verify a public verification key for the plan participant 102. Because the plan participant 102 also has a previous retirement plan account through plan sponsor system 108, the identity management system 120 may have a stored public verification key for the plan participant 102 and may provide the public verification key to the plan sponsor system 110. The plan sponsor system 110 may use the received public verification key for retirement plan transactions involving the plan participant 102. In this way, transactions for the plan participant 102 recorded at the distributed ledger 124 may be recorded using a common public verification key. This may allow the plan participant 102 or other party to track all of the transactions for the plan participant 102 at the distributed ledger 124 using a single public verification key.

Figure 2:
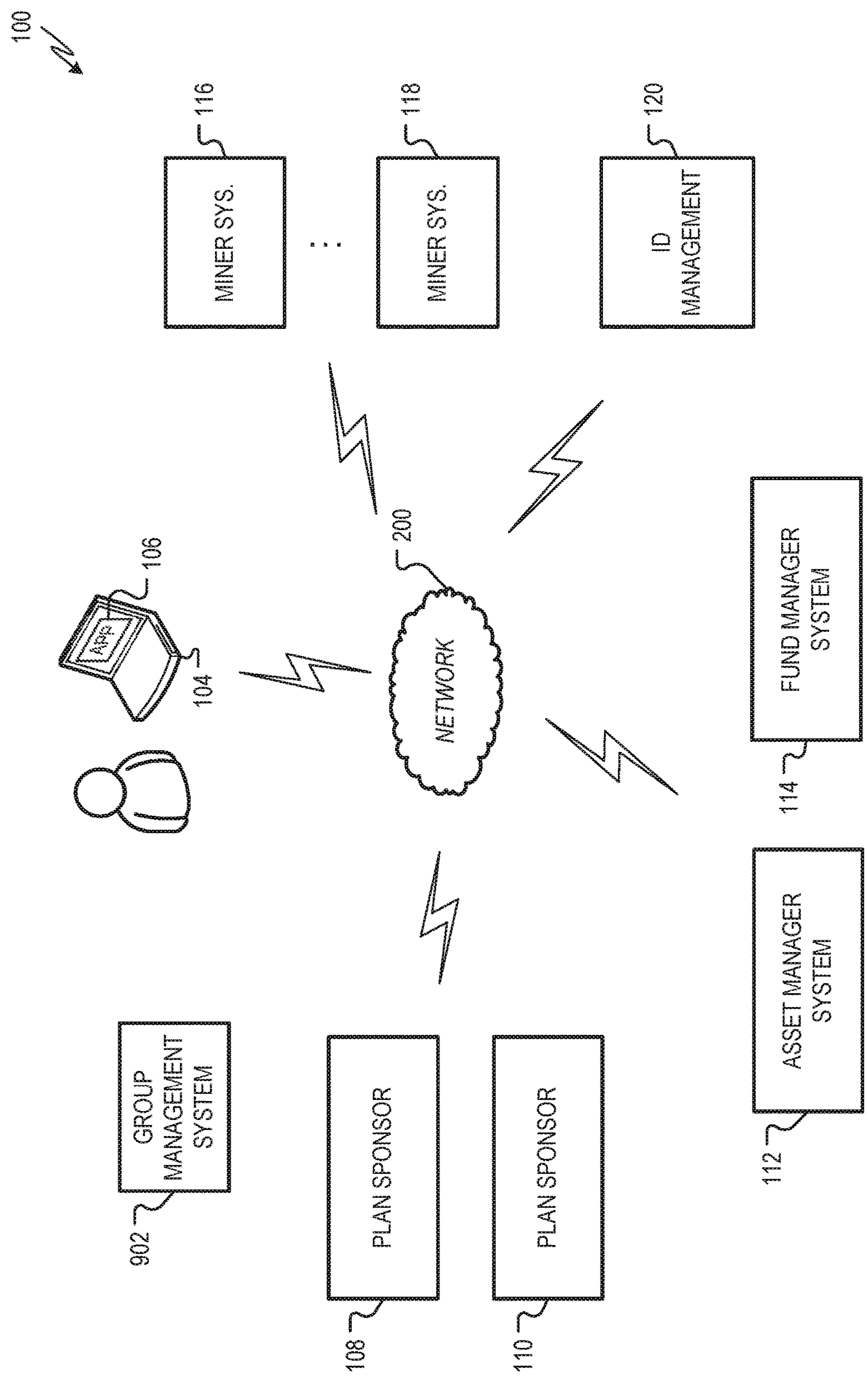
FIG. 2 is a diagram showing another example of the environment including additional details.

FIG. 2 is a diagram showing another example of the environment 100 including additional details. In the example of FIG. 2, the plan sponsor systems 108, 110, asset manager system 112, fund system 114, miner systems 116, 118, identity management system 120 and a group management system 902 (FIG. 9) are in communication with one another via a network 200. The network 200 may be or comprise any suitable network element operated according to any suitable network protocol. For example, one or more portions of the network 200 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, a combination of two or more such networks, and so forth.

Figure 3:
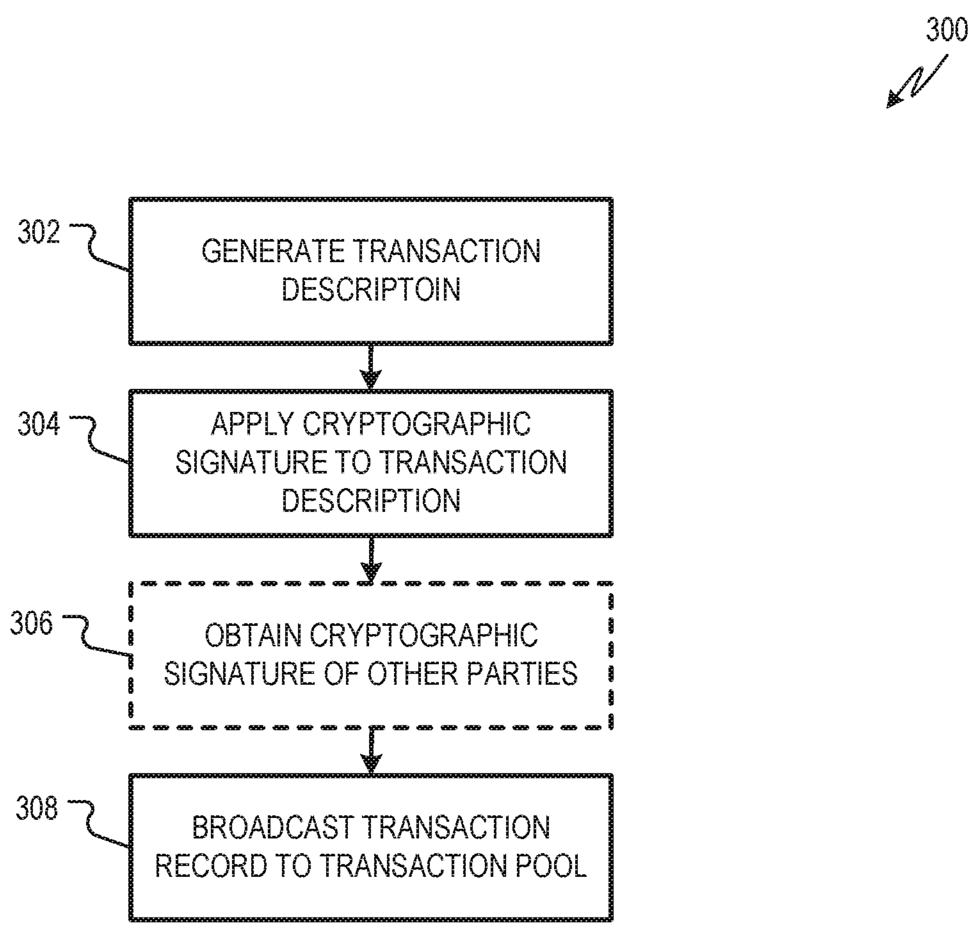
FIG. 3 is a flowchart showing one example of a process flow that may be executed in the environment of FIG. 1 to record a transaction record at the distributed ledger.

FIG. 3 is a flowchart showing one example of a process flow 300 that may be executed in the environment 100 to record a transaction record 122 at the distributed ledger 124. The process flow 300 may be executed by a party to the distributed ledger 124 that is implementing a transaction. In some examples, the transaction described by the process flow 300 is a contribution transaction and the party creating the transaction record (the implementing party) is a plan sponsor system 108, 110. In other examples, the transaction described by the process flow 300 is a distribution to the plan participant (e.g., a withdrawal, loan, and/or the like). The implementing party may be the asset manager system 112. In another example, the transaction is to perfect another transaction. For example, the asset manager system 112 may be the implementing party of a transaction record memorializing the purchase or sale of securities or other assets to perfect a distribution and/or contribution transaction.

At operation 302, the implementing party generates a transaction description. The transaction description may describe details of the transaction such as, for example, an amount of the transaction, whether the transaction is a contribution or a distribution, and the identity of the plan participant 102. The identity of the plan participant may be indicated by the public verification key of the plan participant, for example, as verified by the identity management system 120 as described herein. This may identify the plan participant 102 as the recipient of the contribution and/or distribution.

At operation 304, the implementing party may generate a cryptographic signature based on the transaction description. The cryptographic signature may be generated, for example, using a cryptographic hash function, such as SHA256, that takes as input the transaction description and the private key of the implementing party and generates as output a hash value.

At optional operation 306, the implementing party provides the transaction description to the plan participant 102 and/or other participants in the transaction for those parties to provide their own digital signature of the transaction description. This may provide the plan participant 102, plan sponsor system 108, 110 and/or other parties an opportunity to verify a transaction as it is being implemented and/or recorded, further increasing the security of the system.

At operation 308, the implementing party broadcast a transaction record including the transaction description and the one or more digital signatures. The transaction record is broadcast to the other parties that maintain the distributed ledger. In some examples, the transaction record is broadcast as a stand-alone block for inclusion in the distributed ledger 124. In these examples, the transaction description digitally signed by the implementing party may include some or all of the immediately previous block at the distributed ledger 124. In other examples, the implementing party broadcasts the transaction record to a transaction pool 126, where it may be incorporated, by one or more miner systems 116, 118, into a block for incorporation into the distributed ledger 124.

Figure 4:
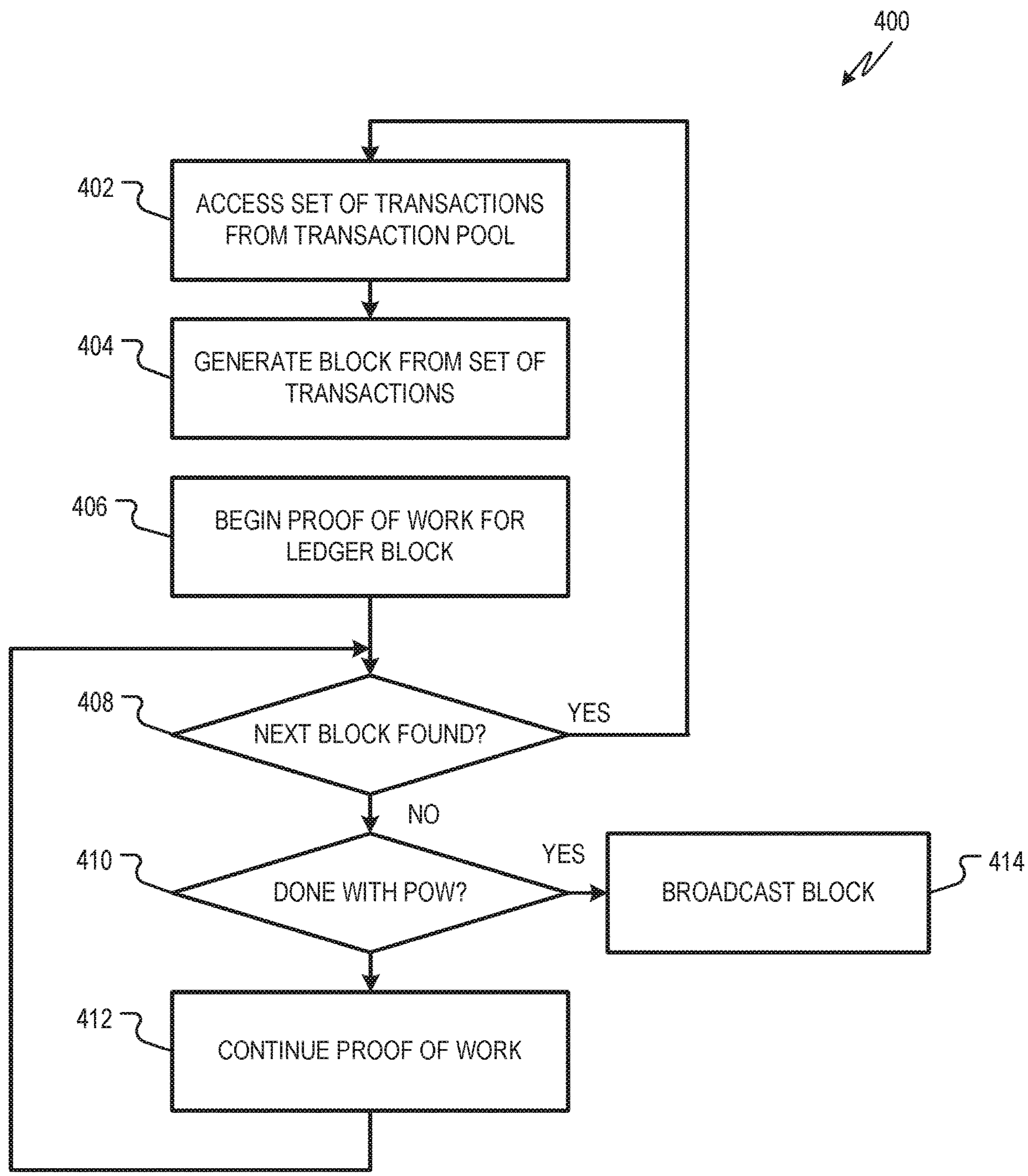
FIG. 4 is a flowchart showing one example of a process flow that may be executed by a miner system to generate blocks for incorporation into the distributed ledger.

FIG. 4 is a flowchart showing one example of a process flow 400 that may be executed by a miner system 116, 118 to generate blocks for incorporation into the distributed ledger 124. In this example, the process flow 400 is described as being implemented by the miner system 116. In practice, however, the process flow 400 may be executed in parallel by multiple miner systems 116, 118.

At operation 402, the miner system 116 accesses a set of transaction records from the transaction pool 126. The miner system 116 may select the set of transaction records in any suitable manner. In some examples, the miner system 116 accesses a set of transaction records having a predetermined number of transaction records. For example, blocks of the distributed ledger 124 may have a predetermined number of transactions in each block. At operation 404, the miner system 116 generates a block using the set of transaction records.

At operation 406, the miner system 116 begins a proof-of-work for the block. The proof-of-work may include, for example, generating a digital signature of the set of transaction records that meets a predetermined property (e.g., beginning with a predetermined number of leading zeros). While determining the proof-of-work, the miner system 116 may determine, at operation 408 whether the next block of the distributed ledger 124 has been found and broadcast by another miner system 118. If the next block has been found, the miner system 116 may return to operation 402 and access a next set of transaction records to generate a next block.

If the next block has not yet been found at operation 408, the miner system 116 may determine, at operation 410, whether it has completed the proof-of-work for the block being generated. If not, the miner system 116 may continue to generate the proof-of-work at operation 412 and periodically re-execute operations 408 and 410. If the miner system 116 has completed the proof-of-work at operation 410, it may, at operation 414, broadcast its block including the proof-of-work, to the parties to the distributed ledger 124. Upon broadcasting a block, the miner system 116 may return to operation 402 to work on a next block.

Figure 5:
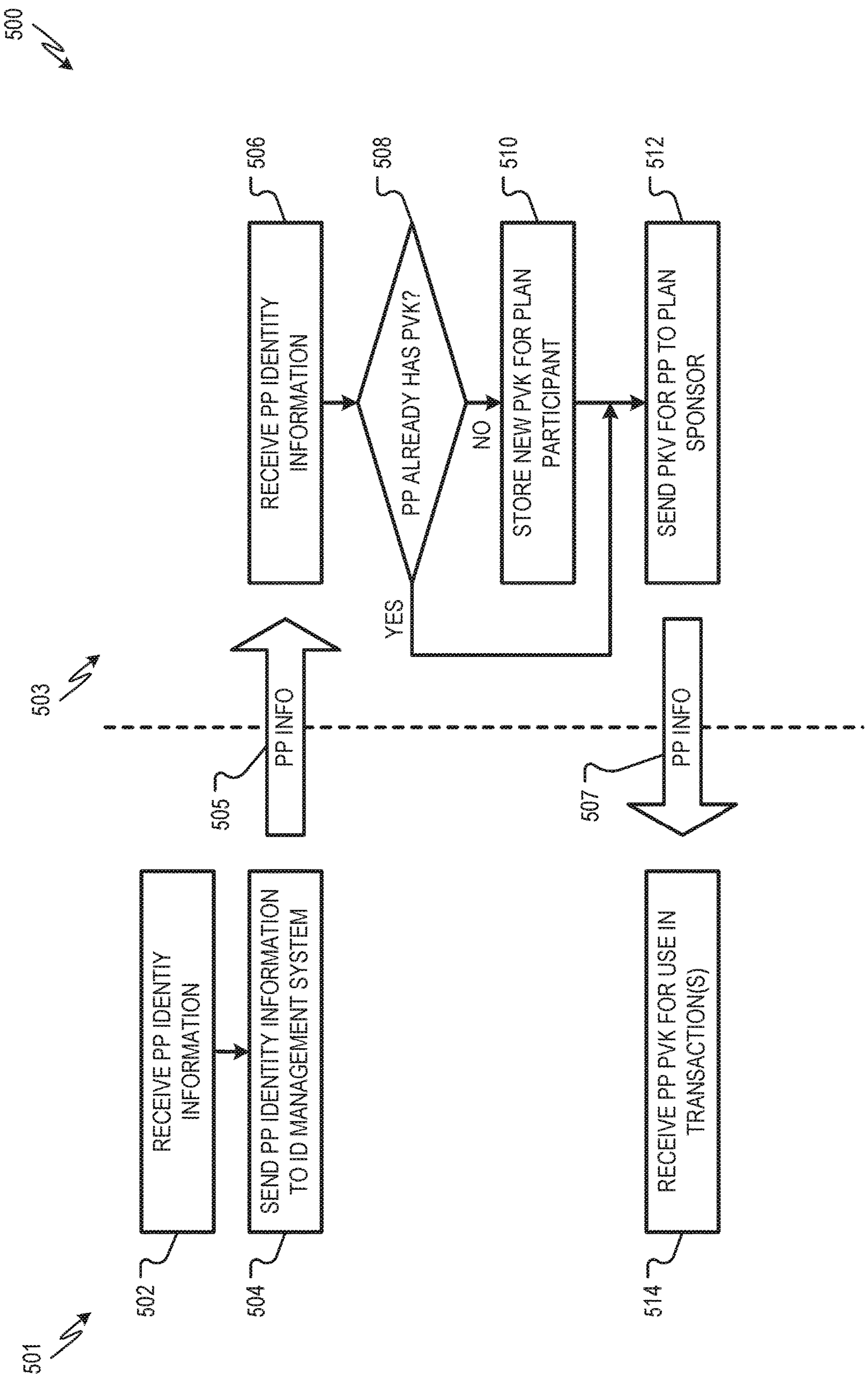
FIG. 5 is a flowchart showing one example of a process flow that may be executed in the environment to verify the identity of a plan participant, such as the plan participant.

FIG. 5 is a flowchart showing one example of a process flow 500 that may be executed in the environment 100 to verify the identity of a plan participant, such as the plan participant 102. The process flow 500 may be executed, for example, when the plan participant 102 opens a retirement plan account with a plan sponsor. The process flow 500 includes two columns 501 and 503. The column 501 includes operations executed by the plan sponsor system 108. The column 503 includes operations executed by the identity management system 120. Although the process flow 500 is described with the plan sponsor system 108 verifying the identity of the plan participant 102, it will be appreciated that, in various examples, different parties may verify the identity of the plan participant 102 in the manner disclosed by the process flow 500 including, for example, another plan sponsor system 110, an asset manager system 112, a fund system 114, and/or the like.

At operation 502, the plan sponsor system 108 receives identity information from the plan participant 102. The identity information may be received electronically via the plan participant computing device 104 and/or application 106 and/or may be received in hard copy. At operation 504, the plan sponsor system 108 provides some or all of the plan participant identity information 505 to the identity management system 120, which receives the information 505 at operation 506. At operation 508, the identity management system 120 uses the plan participant identity information 505 to determine whether it already has a previously generated public verification key for the plan participant 102.

If the identity management system 120 does not have a public verification key stored for the plan participant 102, it may store a new public verification key for the plan participant 102 at operation 510. This may include, for example, generating a public/private key pair for the plan participant 102. In some examples, storing the new public verification key for the plan participant 102 may involve prompting the plan participant 102 to verify his or her identity to the identity management system 120 and provide a public verification key.

If the identity management system 120 has a previously generated a public verification key for the plan participant 102 and/or after storing the new public verification key for the plan participant 102, at operation 512, the identity management system 120 sends to the plan sponsor system 108 plan participant data 507, including the public verification key for the plan participant 102.

The plan sponsor system 108 receives the plan participant data 507 at operation 514. The plan sponsor system 108 may use the public verification key for the plan participant, indicated by the plan participant data 507, to generate transaction records for transactions involving the plan participant 102, as described herein.

Figure 6:
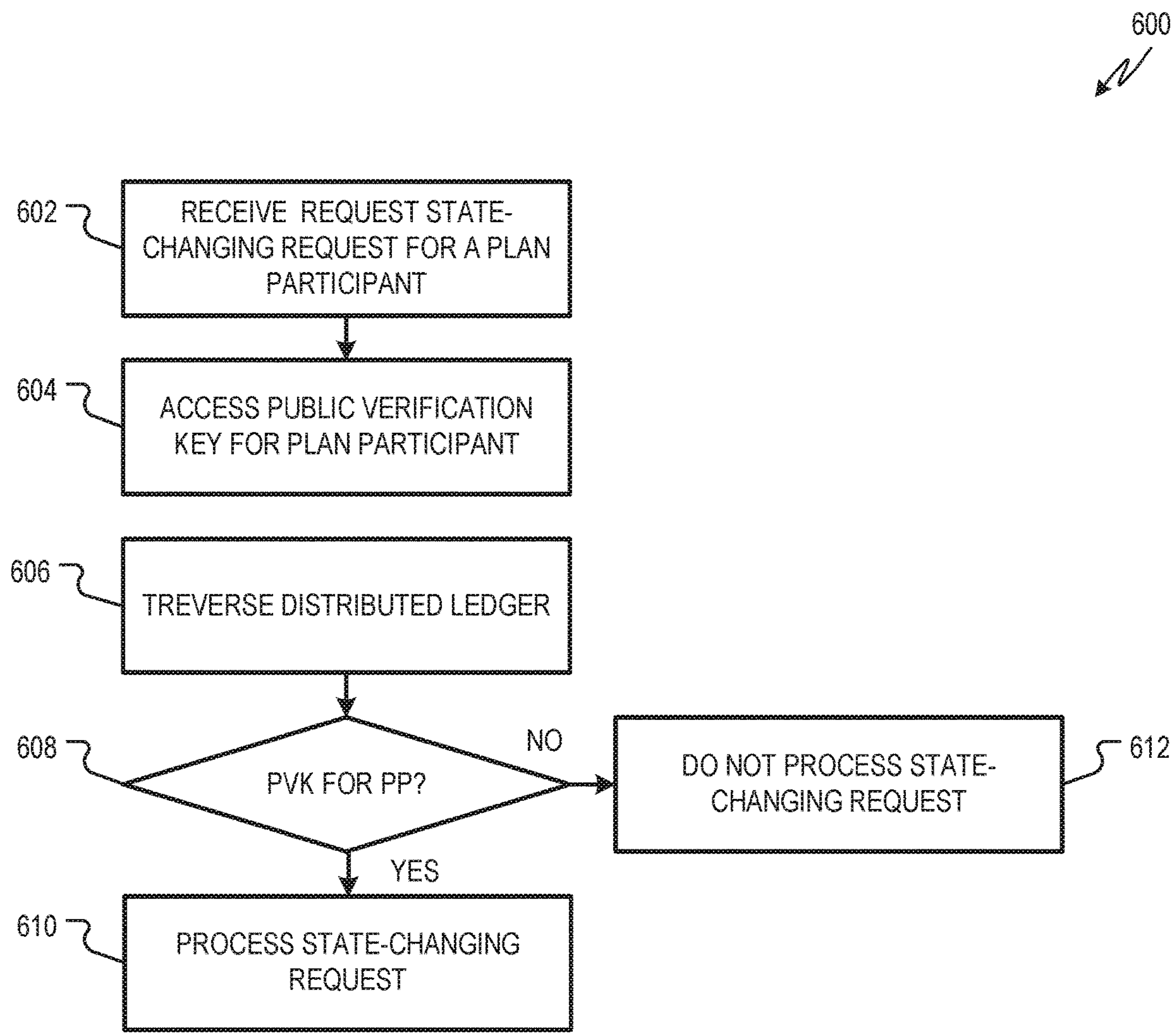
FIG. 6 is a flowchart showing one example of a process flow that may be executed by a party to the distributed ledger in response to receiving a state-changing request.

FIG. 6 is a flowchart showing one example of a process flow 600 that may be executed by a party to the distributed ledger 124 in response to receiving a state-changing request. A state-changing request is a request that changes the state of a retirement plan account held by a plan participant. Examples of state changing requests include a request to change contact information for a plan participant, a request to change the beneficiary of a retirement plan account held by a plan participant, a contribution or distribution request that changes the balance of a retirement plan account held by a plan participant, and the like. The process flow 600 is described as being executed by a receiving party that receives the state changing request from a requesting party. The receiving party may be any party that receives a state-changing request including, for example, by a plan sponsor system 108, 110, an asset manager system 112, and the like.

At operation 602, the receiving party receives a state-changing request from a requesting party. The requesting party may be, for example, the plan participant 102 and/or a party purporting to be the plan participant. At operation 604, the receiving party accesses a public verification key associated with the requesting party. For example, the receiving party may execute the process flow 500 of FIG. 5 with the identity management system 120 to retrieve a public verification key associated with the requesting party. If a public verification key for the requesting party can be determined, the receiving party may traverse the distributed ledger 124 at operation 606 to verify that the public verification key accessed at operation 604 is associated with the retirement plan account that is the subject of the state changing request. If the public verification key matches at operation 608, the receiving party may proceed with the state changing request at operation 610. If public verification key does not match, the receiving party may not proceed with the state-changing request at operation 612. In some examples, if the public verification key does not match the retirement plan account that is the subject of the state changing request the receiving party may initiate a process for associating the public verification key with the retirement plan account. For example, this may occur if there is no public verification key associated with the retirement plan account. A public verification key may be associated with a retirement plan account, for example, as described herein with respect to FIG. 5.

Figure 7:
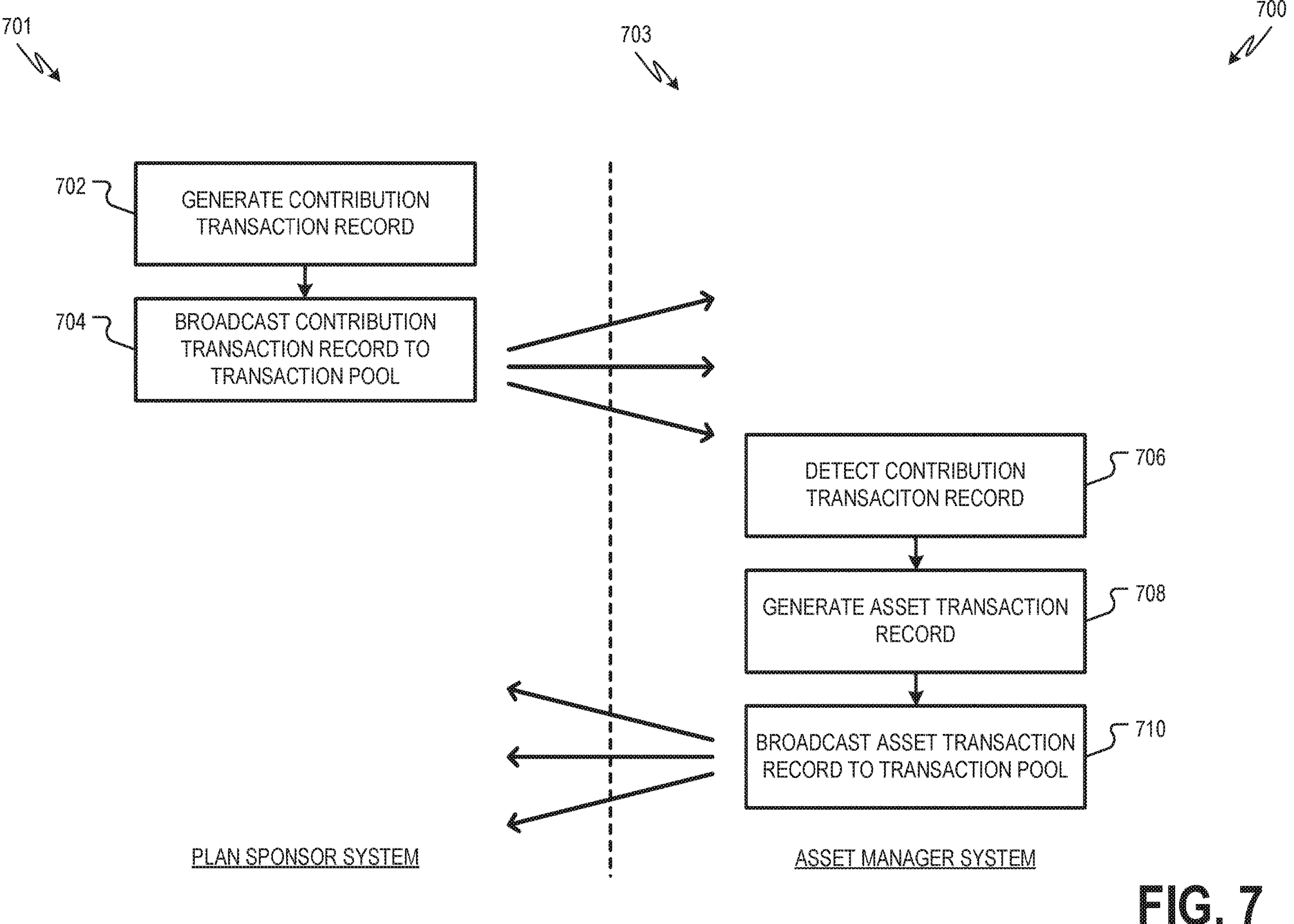
FIG. 7 is a flowchart showing one example of a process flow that may be executed in the environment of FIG. 1 to record a contribution transaction.

FIG. 7 is a flowchart showing one example of a process flow 700 that may be executed in the environment 100 to record a contribution transaction. In this example, the contribution transaction is recorded by the plan sponsor system 108, for example, upon contributing to a retirement account of the plan participant 102, for example, as compensation to the plan participant for employment. The process flow 700 includes two columns 701, 703. The column 701 includes operations executed by the plan sponsor system 108. (It will be appreciated that other plan sponsor systems, such as the plan sponsor system 110, may also execute the operations in column 701.) The column 703 includes operations executed by an asset manager system 112.

At operation 702, the plan sponsor system 108 generates a contribution transaction record describing a contribution transaction. The contribution transaction record may be generated, for example, as described herein with respect to the process flow 300 of FIG. 3. At operation 704, the plan sponsor system 108 broadcasts the contribution transaction record to the parties to the distributed ledger 124. That may include, for example, sending the transaction record directly to the parties of the distributed ledger 124 and/or broadcasting the transaction record to a transaction pool 126, as described herein.

At operation 706, the asset manager system 112 may detect the contribution transaction record. In some examples, the asset manager system detects the contribution transaction record when it is included in a block that is added to the distributed ledger 124. In some examples, in addition to or instead of detecting the contribution transaction record when its block is added to the distributed ledger, the plan sponsor system 108 may provide a request to the asset manager system, where the request includes the contribution transaction record and/or otherwise references the contribution transaction.

At operation 708, the asset manager system 112 generates an asset transaction record. For example, to execute the contribution distribution, the asset manager system 112 may initiate a purchase of securities or other assets to be held in the retirement plan account of the plan participant. The asset transaction record may describe such a purchase of assets. At operation 710, the asset manager system 112 broadcasts the asset transaction record, for example, to the transaction pool 126.

Figure 8:
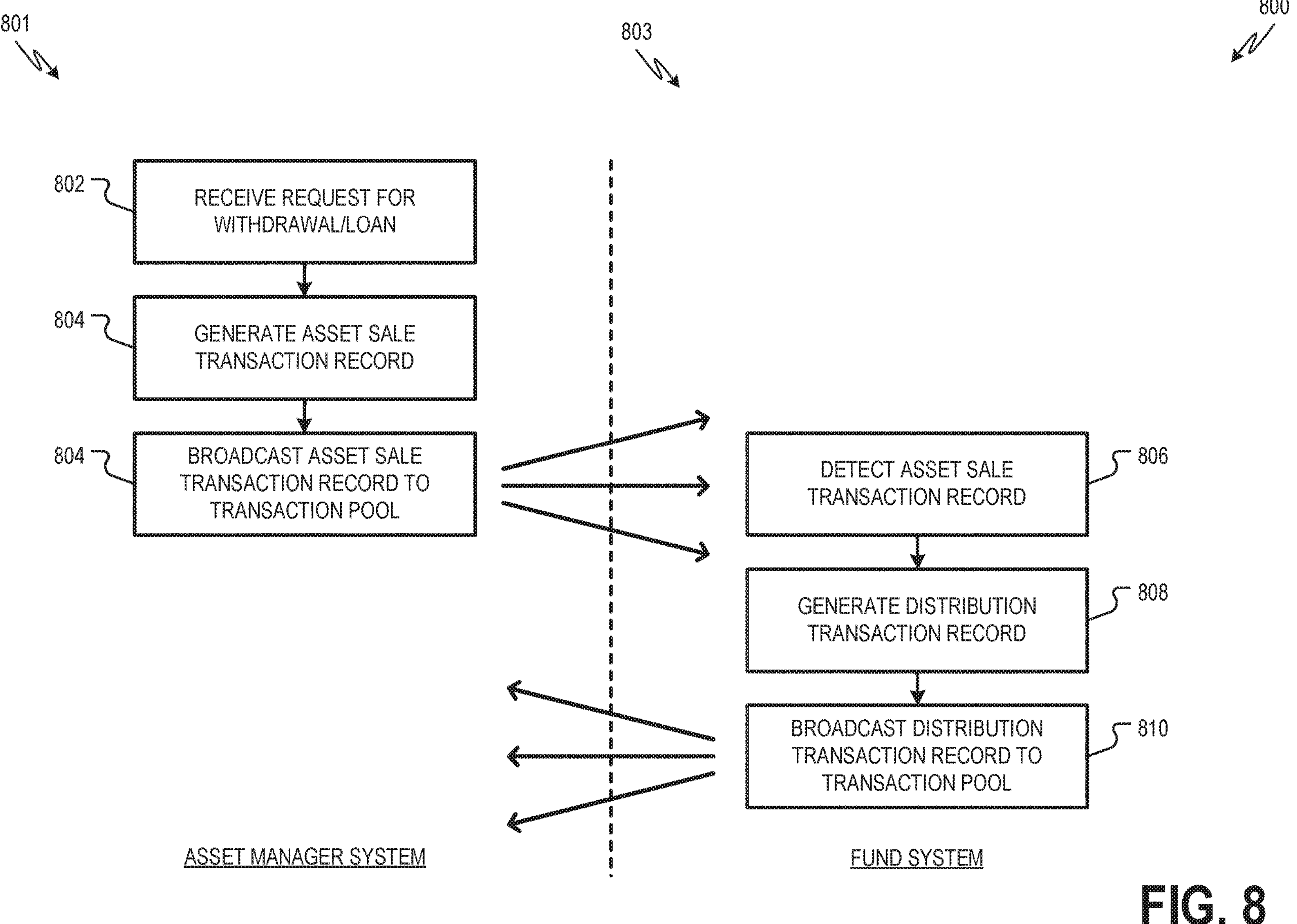
FIG. 8 is a flowchart showing one example of a process flow that may be executed in the environment of FIG. 1 to record a distribution transaction.

FIG. 8 is a flowchart showing one example of a process flow 800 that may be executed in the environment 100 to record a distribution transaction. In this example, the distribution transaction is recorded by the asset manager system 112. The distribution transaction may be, for example, a withdrawal of funds by the plan participant 102, a loan to the plan participant 102, and/or the like. The process flow 800 includes two columns 801, 803. The column 801 includes operations executed by the asset manager system 112. The column 803 includes operations executed by a fund system 114.

At operation 802, the asset manager system 112 generates a distribution transaction record describing a distribution transaction. The distribution transaction record may be generated, for example, as described herein with respect to the process flow 300 of FIG. 3. At operation 804, the asset manager system 112 broadcasts the distribution transaction record to the parties to the distributed ledger 124. That may include, for example, sending the transaction record directly to the parties of the distributed ledger 124 and/or broadcasting the transaction record to a transaction pool 126, as described herein.

At operation 806, the fund system 114 may detect the distribution transaction record and may determine that the distribution transaction described by the distribution transaction record includes the sale of a fund or other asset managed by the fund system 114. In some examples, the fund system 114 detects the distribution transaction record when it is included in a block that is added to the distributed ledger 124. In some examples, in addition to or instead of detecting the distribution transaction record when its block is added to the distributed ledger, the asset manager system 112 may provide a request to the fund system 114, where the request includes the distribution transaction record and/or otherwise references the distribution transaction.

At operation 808, the fund system 114 generates an asset transaction record. For example, to execute the contribution distribution, the fund system 114 may initiate a sale of securities or other assets held in the retirement plan account of the plan participant 102 and provide the funds to the asset manager system 112 for distribution to the plan participant 102. The asset transaction record may describe such a sale of assets. At operation 810, the fund system 114 broadcasts the asset transaction record, for example, to the transaction pool 126.

One perennial challenge to administrators of retirement plan accounts is motivating young plan participants to maintain a retirement plan account and regularly contribute to it. For example, it may be difficult for younger plan participants to keep a regular contribution schedule. Various computing systems can be used to address this concern. For example, a plan sponsor system, asset manager system, or other system can be programmed to send reminders to plan participants who are not making regular contributions to retirement plan accounts. Automated reminders, however, can be easily ignored.

Various examples address these and other challenges utilizing a group management system in conjunction with a distributed ledger for retirement plan account transactions. A distributed ledger, such as the distributed ledger 124 described herein, may be used to record transactions that involve contributions from a plan participant or plan sponsor to a plan participant's retirement plan account or distributions from the retirement plan account to the plan participant. In various examples, the distributed ledger may also be used to record transactions between plan participants.

The group management system may establish participant groupings comprising a number of plan participants. In some examples, the group management system selects plan participants for a participant grouping considering the age of the plan participants. For example, a participant grouping may include a higher number of older, more experienced plan participants. The group management system may use the distributed ledger to track contribution transactions made by the various plan participants of the participant grouping. If a plan participant of the participant grouping has failed to make recommended contributions, the group management system may generate a proposed intra-group transaction. The intra-group transaction may be a loan or transfer of funds from the retirement plan account or accounts of another plan participant or participants of the participant grouping to the retirement plan account of the plan participant that has failed to make recommended contributions. An intra-group transaction between plan participants may be recorded on the distributed ledger, for example, as described herein.

The group management system may also monitor the distributed ledger to detect repayment transactions. For example, a plan participant who is the recipient of an intra-group transaction may make one or more repayment transactions to the other plan participant or participants to repay them for the intra-group transaction. When the group management system detects a repayment transaction, it may offset the amount of the repayment transaction against what is owed. In this way, plan participants may be encouraged to make regular contributions to their retirement plan accounts including a mechanism for borrowing or receiving funds to make up for missed payments.

Figure 9:
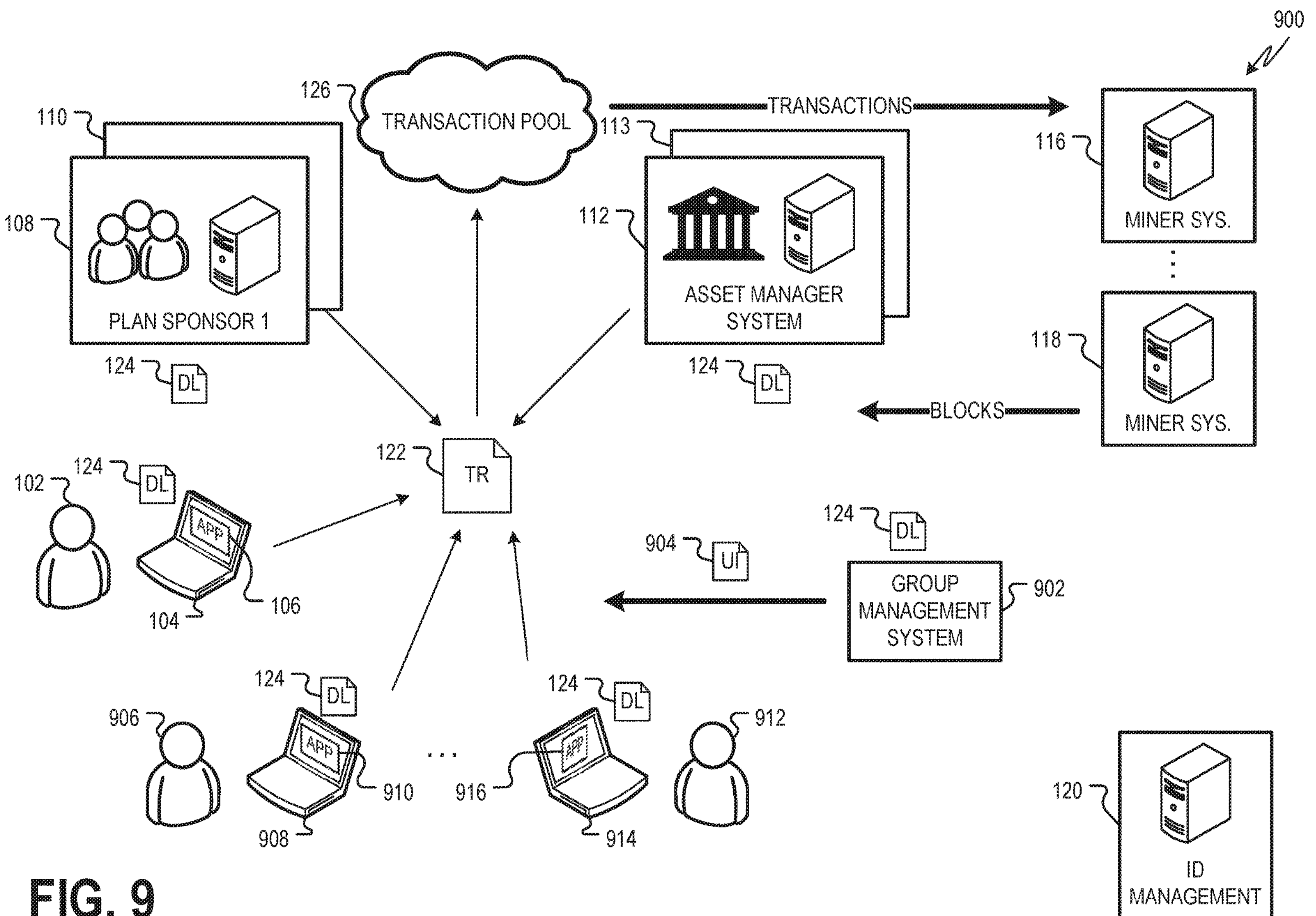
FIG. 9 is a diagram showing one example of an environment including a group management system.

FIG. 9 is a diagram showing one example of an environment 900 including a group management system 902. The environment 900 shows the plan participant 102 with a plan participant computing device 104 executing application 106 as well as additional example plan participants 906, 912 with respective plan participant computing devices 908, 914 executing respective applications 910, 916. The environment 900 also includes plan sponsor systems 108, 110, the asset manager system 112, an additional asset manager system 113, miner systems 116, 118, and identity management system 120. Although the fund system 114 of FIG. 1 is not shown in FIG. 9, it will be appreciated that one or more fund systems may be used in the environment 900.

The group management system 902 may comprise one or more computing devices, such as servers and/or the like. The group management system 902 may be implemented at a single geographic location and/or across multiple geographic locations. In some examples, the group management system 902 may be implemented in whole or in part using a cloud deployment such as according to an infrastructure as a service (IaaS), platform as a service (PaaS) or similar arrangement.

The group management system 902, in some examples, is a party to the distributed ledger 124. For example, the group management system 902 may store a copy of the distributed ledger 124 and may receive new blocks to be added to the distributed ledger 124 from other parties to the distributed ledger 124 such as, for example, the miner systems 116, 118 and/or other systems that generate transaction records, as described herein.

The group management system 902 may also provide a user interface 904 to the plan participants 102, 906, 912, for example, via the applications 106, 910, 916. In some examples, the group management system 902 may be or include a web server. The applications 106, 910, 916 may be web browsers configured to access a web application provided via the web server. The user interface 904 provided to the various plan participants 102, 906, 912 may be provided at a display or other suitable output device of the plan participant computing devices 104, 908, 914.

Figure 10:
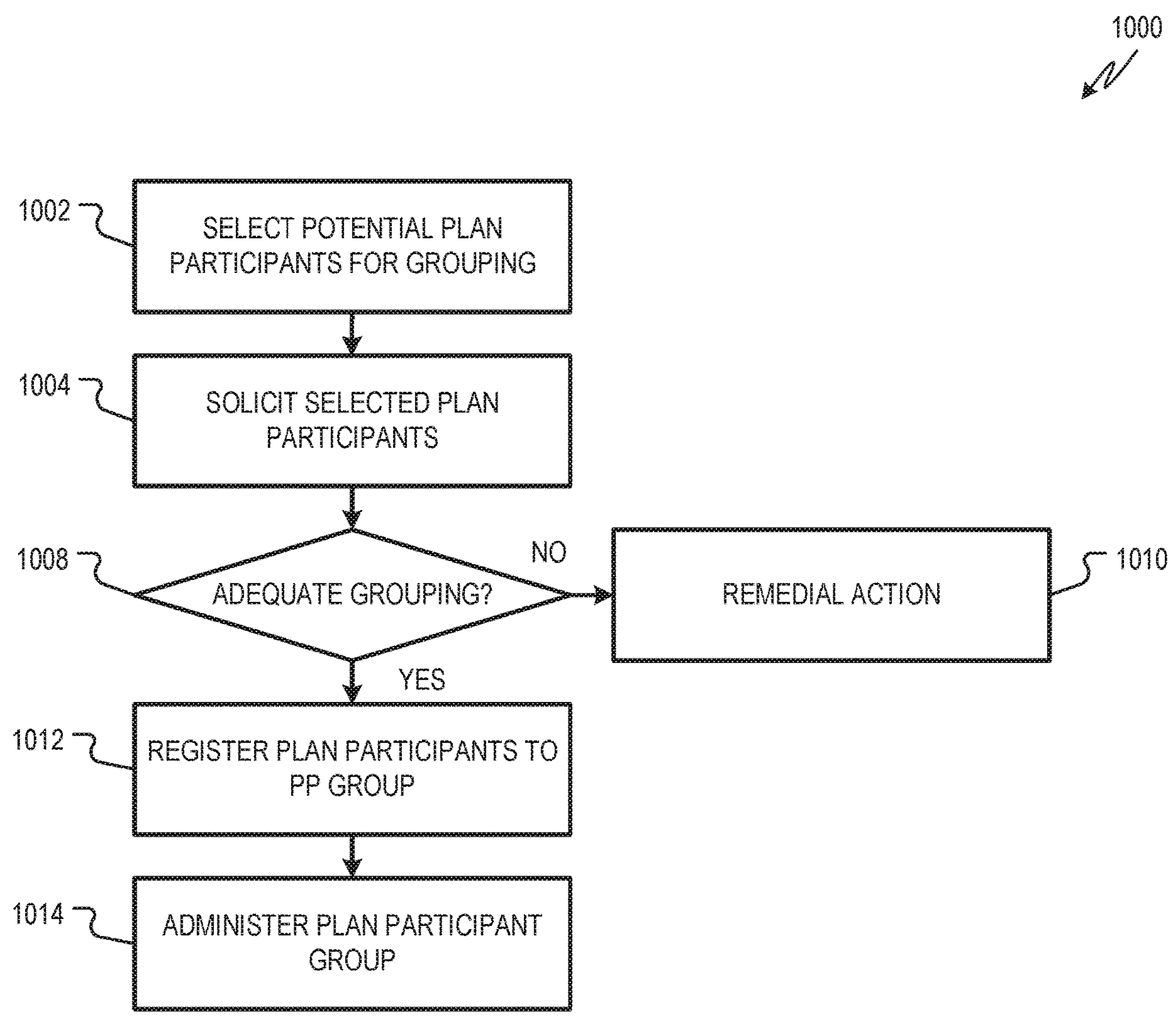
FIG. 10 is a flowchart showing one example of a process flow that may be executed by the group management system of FIG. 9 to facilitate intra-group transactions.

FIG. 10 is a flowchart showing one example of a process flow 1000 that may be executed by the group management system 902 to facilitate intra-group transactions. At operation 1002, the group management system 902 selects potential plan participants for a participant grouping. The potential plan participants may be selected from the plan participants 102, 906, 912 using the distributed ledger 124. The potential plan participants may all participate in a retirement plan managed by a common plan sponsor system 108, 110 and/or by a common asset manager system 112, 113 and/or may be selected from participants in different retirement plans administered by different plan sponsor systems 108, 110 and/or different asset manager systems 112, 113.

In some examples, the potential plan participants of the participant grouping are selected according to at least one criterion. In some examples, the potential plan participants may be selected based on age. For example, the group management system 902 may select the potential plan participants to have a predetermined ratio of older plan participants to younger plan participants.

At operation 1004, the group management system 902 solicits the potential plan participants selected at operation 1002. Soliciting the potential plan participants may include contacting the potential plan participants, for example, via the user interface 904 on the respective plan participant computing devices 104, 908, 914. In other examples, the group management system 902 may solicit the potential plan participants using another communication medium such as, for example, e-mail, short message service (SMS), and/or the like. Upon being solicited, the potential plan participants may indicate whether they would like to join the proposed plan participant. In some examples, a potential plan participant may affirmatively indicate consent to join the participant grouping. For example, potential plan participants who do not respond to the solicitation at operation 1004 may not be added to the participant grouping.

At operation 1008, the group management system 902 determines if the plan participants who have consented to join the participant grouping are an adequate grouping. For example, the group management system 902 may determine whether the consenting plan participants meet at least one criterion. In some examples, the at least one criterion applied at operation 1008 is the same criterion applied at operation 1002 to select the potential plan participants. If the plan participants who have consented to join the participant grouping are not an adequate grouping, the group management system 902 may, at operation 1010, execute a remedial action. The remedial action may include, for example, cancelling the creation of the participant grouping. In some examples, the remedial action may include returning to operation 1002 and selecting potential plan participants for a new participant grouping. Also, in some examples, the remedial action may include selecting supplemental plan participants and soliciting those potential plan participants to join the participant grouping along with those potential plan participants who previously consented at operation 1004.

If there is an adequate grouping, either before or after a remedial action, the group management system 902 may register plan participants to the participant grouping at operation 1012. This may involve accessing public verification keys for the respective plan participants making up the participant grouping. In some examples, the plan participants may be solicited (e.g., via the user interface 904) to provide their respective public verification keys. In some examples, the plan participants are solicited via the user interface 904 to provide identifying information. The group management system 902 may utilize the identity management system 120 as described herein to provide and/or verify the public verification keys for the respective plan participants.

At operation 1014, the group management system 902 may administer the participant grouping. Administering the participant grouping may include, for example, monitoring transactions involving the plan participants of the participant grouping as indicated on the distributed ledger and responding as described herein. For example, the group management system 902 may propose intra-group transactions, as described herein at FIGS. 11 and 12 and/or may set up plan participant tags, as described herein at FIG. 13.

Figure 11:
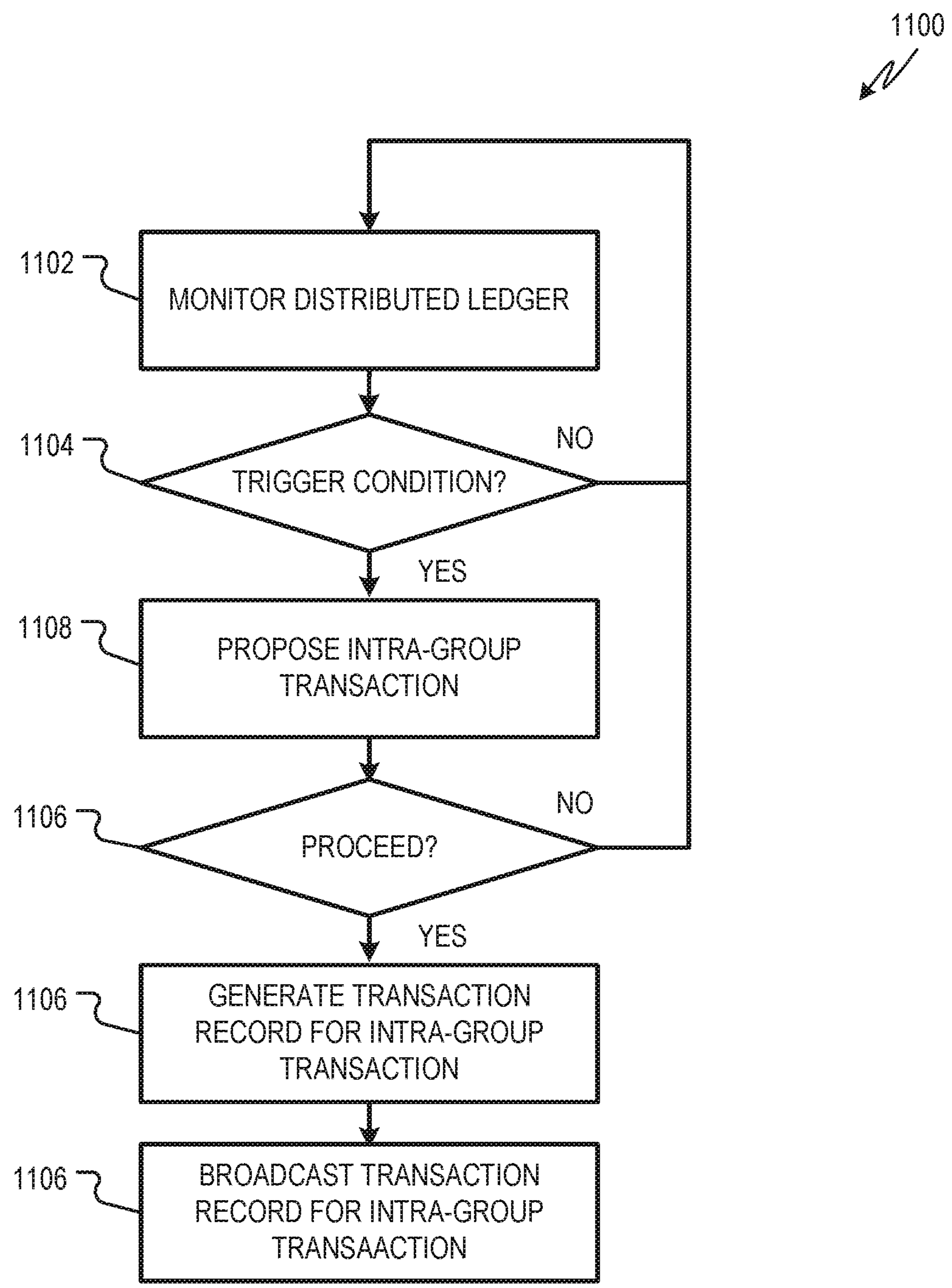
FIG. 11 is a flowchart showing one example of a process flow that may be executed by the group management system of FIG. 9 to initiate an intra-group transaction between some or all of the plan participants of a participant grouping.

FIG. 11 is a flowchart showing one example of a process flow 1100 that may be executed by the group management system 902 to initiate an intra-group transaction between some or all of the plan participants of a participant grouping. At operation 1102, the group management system 902 monitors the distributed ledger 124 for transactions on retirement plan accounts held by plan participants that are part of the participant grouping. For example, the group management system 902 may monitor as new blocks and/or transactions are added to the distributed ledger 124. The group management system 902 may detect transactions involving plan participants who are part of the participant grouping using the respective public verification keys of the plan participants. For example, as described herein, each transaction record indicated at a block of the distributed ledger 124 may indicate the public transaction key of the plan participant whose account is part of the transaction.

Monitoring the transactions of plan participants at operation 1102 may include monitoring transactions that do take place as well as transactions that do not take place. For example, the group management system 902 may determine if a plan participant of the participant grouping is (or is not) making regular contributions to a retirement plan account.

At operation 1104, the group management system 902 may determine if the distributed ledger 124 (e.g., the transactions indicated thereon) indicate a trigger condition for any of the plan participants of the participant grouping. A trigger condition may be met for a plan participant, for example, if the plan participant has failed to make one or more scheduled contributions to the plan participant's retirement plan accounts. In another example, a trigger condition may be met if the plan participant has contributed to a retirement plan account at above a threshold level, suggesting that the plan participant may be in a position to lend funds to another plan participant of the participant group. If no trigger condition is met, the group management system 902 may continue to monitor the distributed ledger 124 at operation 1102.

If a trigger condition is met, the group management system 902 may propose an intra-group transaction at operation 1108. The intragroup transaction may include a transfer of funds from one or more of the plan participants of the participant group to another of the plan participants of the participant group. The group management system 902 may select the intra-group transaction to propose based on the trigger condition detected at operation 1104. For example, if the trigger condition indicated that a first plan participant had missed one or more scheduled contributions to the first plan participants retirement plan account, the intra-group transaction may be a loan or transfer to the first plan participant from one or more of the other plan participants.

Proposing the intra-group transaction may include sending an indication of the proposed intra-group transaction to some or all of the plan participants of the participant grouping. In some examples, the indication of the proposed intra-group transaction may be sent via the user interface 904. Plan participants who choose to take part in the intra-group transaction may indicate consent for the intragroup transaction, for example, by selecting an indicated element of the user interface 904, by sending an e-mail or other message to the group management system 902 and/or by another appropriate mechanism. In some examples, a plan participant who chooses to take part in the intra-group transaction may also indicate an amount that the plan participant will contribute to the intra-group transaction.

At operation 1106, the group management system 902 determines if the consenting plan participants are sufficient to proceed with the intra-group transaction. For example, if the total amount of funding consented to by the plan participant members is less than a threshold amount, the intra-group transaction may not go forward. Also, in some examples, the intra-group transaction may not proceed if the total number of plan participants who have consented to the intra-group transaction is less than a threshold number. If the intra-group transaction does not proceed, the group management system 902 may continue monitoring the distributed ledger 124 at operation 1102.

If the intra-group transaction is to proceed, the group management system 902 may generate a transaction record for the intra-group transaction at operation 1108. The transaction record may indicate the public verification key of the payor plan participants and the receiving plan participant or participants. In some examples, the group management system 902 generates a transaction description for the intra-group transaction and provides the transaction description to the payor plan participants. The payor plan participants may provide a digital signature of the transaction description made with the payor plan participants' respective private keys. The transaction description may also indicate a public verification key of the receiving plan participant. At operation 1110, the group management system 902 may broadcast the transaction record for the intra-group transaction to be included in the distributed ledger 124, as described herein. In some examples, the group management system 902 may also generate an instruction, for example, to an asset manager system 112, 113, a plan sponsor system 108, 110, or other suitable system to initiate execution of the intra-group transaction.

Figure 12:
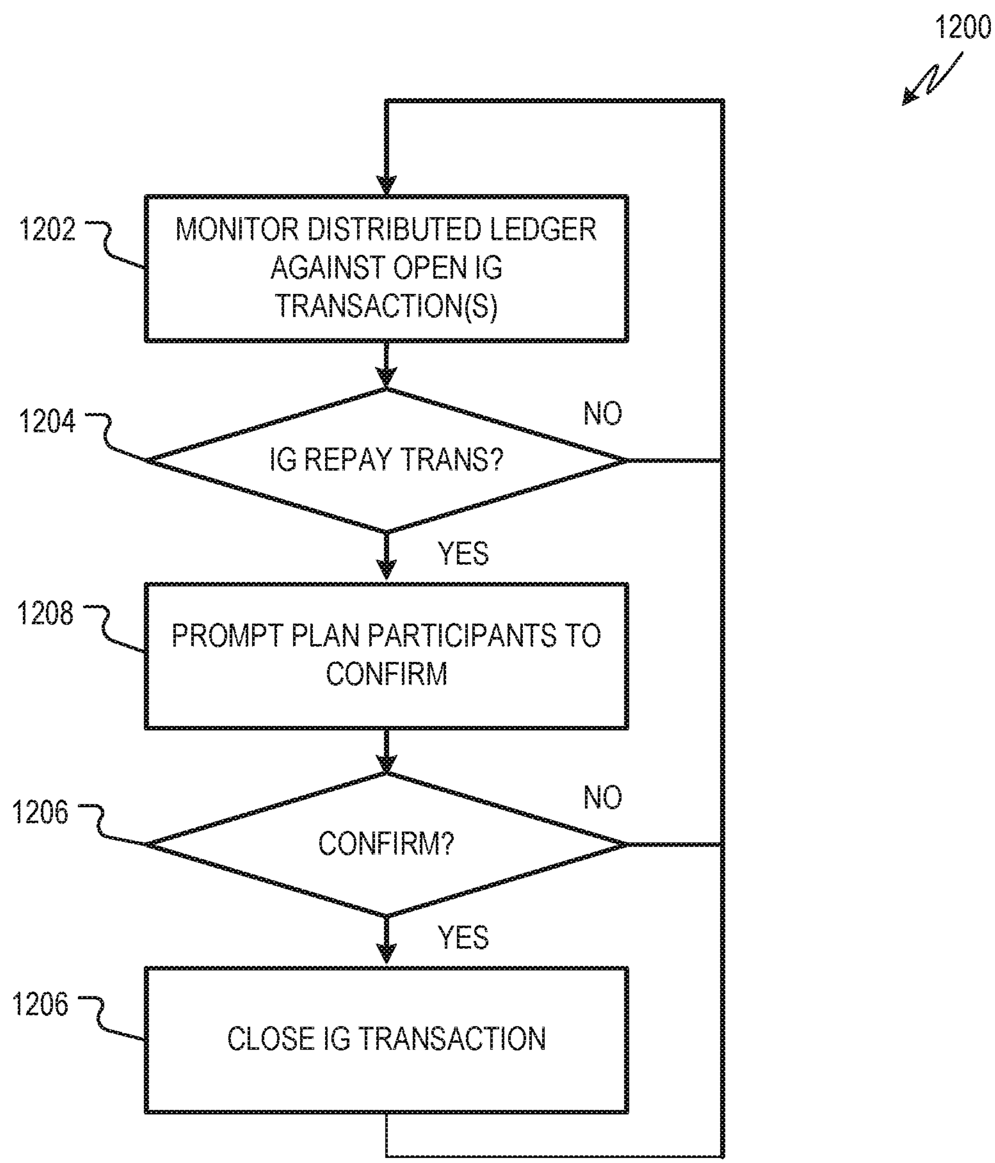
FIG. 12 is a flowchart showing one example of a process flow that may be executed by the group management system to monitor open intra-group transactions within a participant group.

FIG. 12 is a flowchart showing one example of a process flow 1200 that may be executed by the group management system 902 to monitor open intra-group transactions within a participant group. As described herein, an intra-group transaction may be a loan from one or more plan participants to another plan participant of the group. The receiving plan participant or participants may repay the payor plan participants using the distributed ledger 124, as described herein. At operation 1202, the group management system 902 may monitor the distributed ledger 124 against open intra-group transactions. An open intra-group transaction may be an intra-group transaction that has not yet been settled by a return payment or payments from the receiving plan participant to the initial payor plan participant.

At operation 1204, the group management system 902 determines if it has detected an intra-group transaction repayment transaction at the distributed ledger. A repayment transaction may be a transaction from a first plan participant to one or more other plan participants that repays one or more other plan participants for a previous intra-group transaction. If a repayment transaction is not detected at operation 1204, the group management system 902 may continue monitoring the distributed ledger 124 at operation 1202.

If a repayment transaction is detected at operation 1204, the group management system 902 may, at operation 1206, prompt the parties to the repayment transaction to confirm that the repayment transaction was intended to be repayment for a previous intra-group transaction. If, at operation 1208, the parties confirm that the repayment transaction was intended to be repayment for the previous intra-group transaction, the group management system 902 may close the intragroup transaction at operation 1210. When the intra-group transaction is closed, for example, the group management system 902 may no longer monitor the distributed ledger 124 for potential repayment transactions for the closed intra-group transactions. The group management system 902 may write or otherwise store an indication that the intra-group transaction is closed.

In some examples, the group management system 902 may confirm that an amount of the repayment transaction is sufficient to cover the corresponding intra-group transaction and/or whether one or more repayment transactions have compensated each plan participant who contributed to the intra-group transaction. If the amount of the repayment transaction is not sufficient to cover the corresponding intra-group transaction and/or one or more repayment transactions have not fully compensated each plan participant who contributed to the intra-group transaction, the group management system 902 may leave the intra-group transaction open and continue to monitor the distributed ledger 124 for additional repayment transactions.

Figure 13:
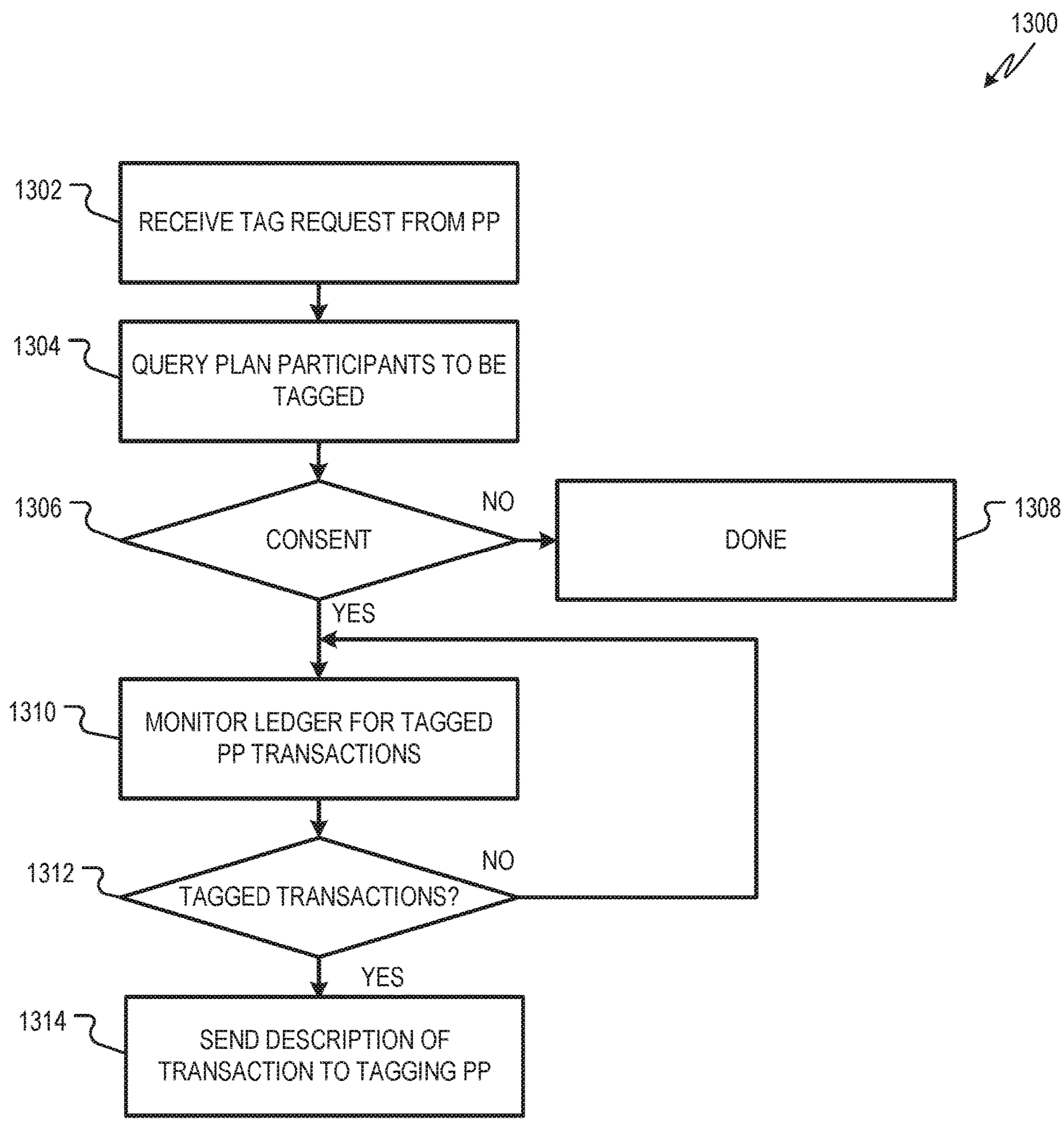
FIG. 13 is a flowchart showing one example of a process flow that may be executed by the group management system of FIG. 9 to allow a plan participant to tag and monitor one or more other plan participants.

FIG. 13 is a flowchart showing one example of a process flow 1300 that may be executed by the group management system 902 to allow a plan participant to tag and monitor one or more other plan participants. For example, a younger, less experienced plan participant may which to tag and track an older, more experienced plan participant. Providing the younger, less experienced plan participant with data describing the behavior of the tagged plan participant may contribute to the education of the younger, less experienced plan participant. The process flow 1300 is described in terms of a first plan participant tagging and tracking a second plan participant. It will be appreciated that, in some examples, a single plan participant may tag and track more than one other plan participants.

At operation 1302, the group management system 902 receives a tag request from a first plan participant. The tag request indicates a second plan participant that the first plan participant would like to tag and track. At operation 1304, the group management system 902 queries the second plan participant indicated by the tag request to determine if the second plan participant consents to being tracked by the first plan participant. If the second plan participant does not consent to be tracked at operation 1306, the process flow 1300 may conclude at operation 1308.

If the second plan participant does consent to be tracked by the first plan participant, the group management system 902 may begin monitoring the distributed ledger 124 for tagged transactions at operation 1310. Tagged transactions may be transactions on retirement plan accounts made by the second plan participant. Monitoring for tagged transactions may include, for example, comparing a public verification key of the second plan participant to transaction records indicated at the distributed ledger 124. If no tagged transaction is determined at operation 1312, the group management system 902 may continue monitoring the distributed ledger 124 at operation 1310. If a tagged transaction is determined at operation 1312, the group management system 902 may send a description of the tagged transaction to the first plan participant at operation 1314. For example, the group management system 902 may send the description via the user interface 904.

FIG. 14 is a block diagram 1400 showing one example of a software architecture 1402 for a computing device. The software architecture 1402 may be used in conjunction with various hardware architectures, for example, as described herein. FIG. 14 is merely a non-limiting example of a software architecture 1402, and many other architectures may be implemented to facilitate the functionality described herein. A representative hardware layer 1404 is illustrated and can represent, for example, any of the above-referenced computing devices. In some examples, the hardware layer 1404 may be implemented according to an architecture 1500 of FIG. 15.

The representative hardware layer 1404 comprises one or more processing units 1406 having associated executable instructions 1408. The executable instructions 1408 represent the executable instructions of the software architecture 1402, including implementation of the methods, modules, components, and so forth of FIGS. 1-13. The hardware layer 1404 also includes memory and/or storage modules 1410, which also have the executable instructions 1408. The hardware layer 1404 may also comprise other hardware 1412, which represents any other hardware of the hardware layer 1404, such as the other hardware illustrated as part of the architecture 1500.

In the example architecture of FIG. 14, the software architecture 1402 may be conceptualized as a stack of layers where each layer provides particular functionality. For example, the software architecture 1402 may include layers such as an operating system 1414, libraries 1416, middleware layer 1418, applications 1420, and a presentation layer 1444. Operationally, the applications 1420 and/or other components within the layers may invoke application programming interface (API) calls 1424 through the software stack and receive a response, returned values, and so forth illustrated as messages 1426 in response to the API calls 1424. The layers illustrated are representative in nature and not all software architectures have all layers. For example, some mobile or special-purpose operating systems may not provide a middleware layer 1418, while others may provide such a layer. Other software architectures may include additional or different layers.

The operating system 1414 may manage hardware resources and provide common services. The operating system 1414 may include, for example, a kernel 1428, services 1430, and drivers 1432. The kernel 1428 may act as an abstraction layer between the hardware and the other software layers. For example, the kernel 1428 may be responsible for memory management, processor management (e.g., scheduling), component management, networking, security settings, and so on. The services 1430 may provide other common services for the other software layers. In some examples, the services 1430 include an interrupt service. The interrupt service may detect the receipt of a hardware or software interrupt and, in response, cause the software architecture 1402 to pause its current processing and execute an interrupt service routine (ISR) when an interrupt is received. The ISR may generate an alert.

The drivers 1432 may be responsible for controlling or interfacing with the underlying hardware. For instance, the drivers 1432 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1416 may provide a common infrastructure that may be utilized by the applications 1420 and/or other components and/or layers. The libraries 1416 typically provide functionality that allows other software modules to perform tasks in an easier fashion than by interfacing directly with the underlying operating system 1414 functionality (e.g., kernel 1428, services 1430, and/or drivers 1432). The libraries 1416 may include system libraries 1434 (e.g., C standard library) that may provide functions such as memory allocation functions, string manipulation functions, mathematic functions, and the like. In addition, the libraries 1416 may include API libraries 1436 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1416 may also include a wide variety of other libraries 1438 to provide many other APIs to the applications 1420 and other software components/modules.

The middleware layer 1418 (also sometimes referred to as frameworks) may provide a higher-level common infrastructure that may be utilized by the applications 1420 and/or other software components/modules. For example, the middleware layer 1418 may provide various graphical UI functions, high-level resource management, high-level location services, and so forth. The middleware layer 1418 may provide a broad spectrum of other APIs that may be utilized by the applications 1420 and/or other software components/modules, some of which may be specific to a particular operating system or platform.

The applications 1420 include built-in applications 1440 and/or third-party applications 1442. Examples of representative built-in applications 1440 may include, but are not limited to, a contacts application, a browser application, a book reader application, a location application, a media application, a messaging application, and/or a game application. The third-party applications 1442 may include any of the built-in applications 1440 as well as a broad assortment of other applications. In a specific example, the third-party application 1442 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 1442 may invoke the API calls 1424 provided by the mobile operating system such as the operating system 1414 to facilitate functionality described herein.

The applications 1420 may utilize built-in operating system functions (e.g., kernel 1428, services 1430, and/or drivers 1432), libraries (e.g., system libraries 1434, API libraries 1436, and other libraries 1438), or middleware layer 1418 to create UIs to interact with users of the system. Alternatively, or additionally, in some systems, interactions with a user may occur through a presentation layer, such as the presentation layer 1444. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 14, this is illustrated by a virtual machine 1448. A virtual machine creates a software environment where applications/modules can execute as if they were executing on a hardware computing device. The virtual machine 1448 is hosted by a host operating system (e.g., the operating system 1414) and typically, although not always, has a virtual machine monitor 1446, which manages the operation of the virtual machine 1448 as well as the interface with the host operating system (e.g., the operating system 1414). A software architecture executes within the virtual machine 1448, such as an operating system 1450, libraries 1452, frameworks/middleware 1454, applications 1456, and/or a presentation layer 1458. These layers of software architecture executing within the virtual machine 1448 can be the same as corresponding layers previously described or may be different.

Figure 15:
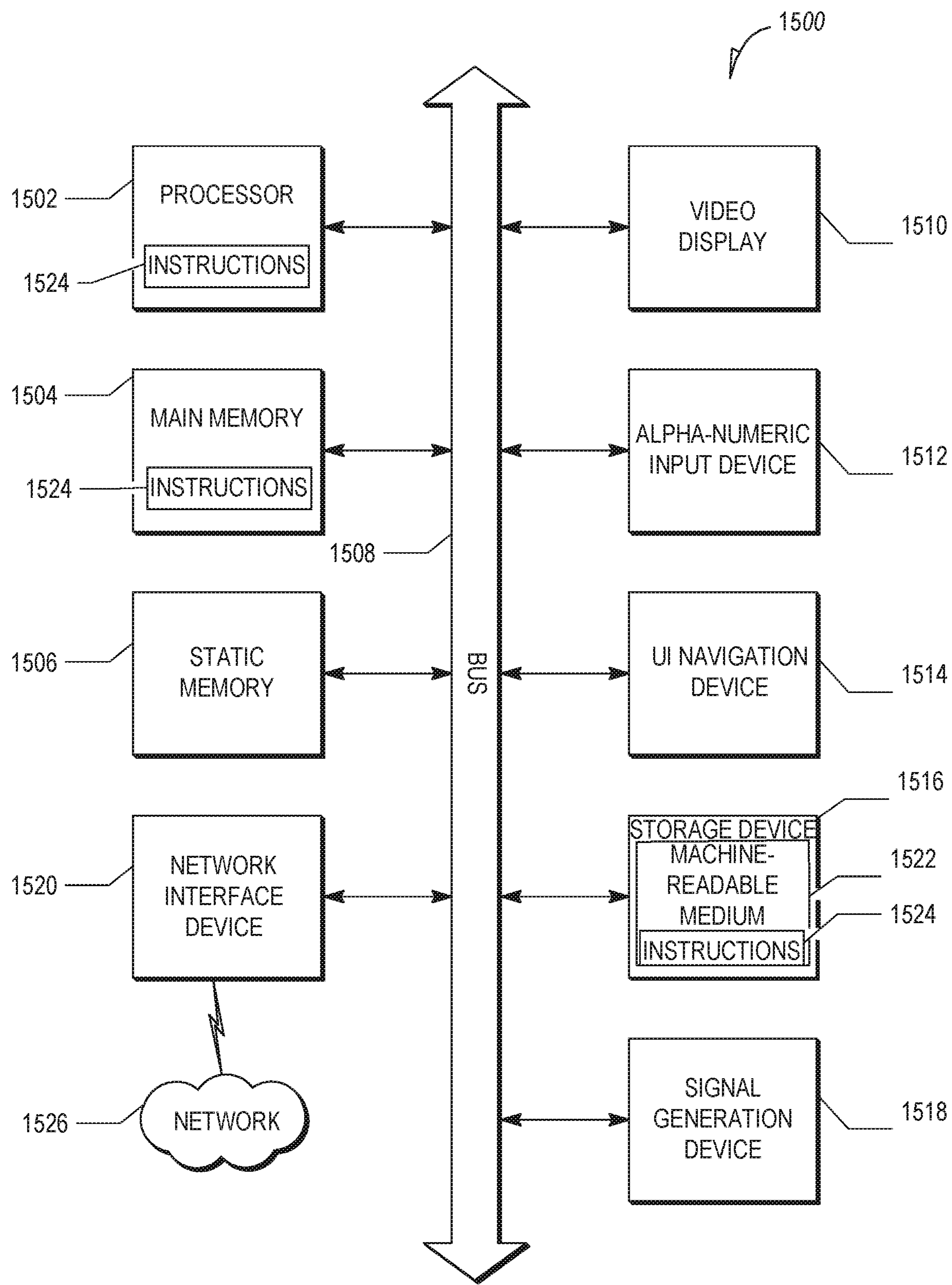
FIG. 15 is a block diagram illustrating a computing device hardware architecture, within which a set or sequence of instructions can be executed to cause a machine to perform examples of any one of the methodologies discussed herein.

FIG. 15 is a block diagram illustrating a computing device hardware architecture 1500, within which a set or sequence of instructions can be executed to cause a machine to perform examples of any one of the methodologies discussed herein. The architecture 1500 may describe, for example, any of the computing devices and/or control circuits described herein. The architecture 1500 may execute the software architecture 1402 described with respect to FIG. 14. The architecture 1500 may operate as a standalone device or may be connected (e.g., networked) to other machines. In a networked deployment, the architecture 1500 may operate in the capacity of either a server or a client machine in server-client network environments, or it may act as a peer machine in peer-to-peer (or distributed) network environments. The architecture 1500 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 1500 includes a processor unit 1502 comprising at least one processor (e.g., a central processing unit (CPU), a graphics processing unit (GPU), or both, processor cores, compute nodes, etc.). The architecture 1500 may further comprise a main memory 1504 and a static memory 1506, which communicate with each other via a link 1508 (e.g., a bus). The architecture 1500 can further include a video display unit 1510, an alphanumeric input device 1512 (e.g., a keyboard), and a UI navigation device 1514 (e.g., a mouse). In some examples, the video display unit 1510, alphanumeric input device 1512, and UI navigation device 1514 are incorporated into a touchscreen display. The architecture 1500 may additionally include a storage device 1516 (e.g., a drive unit), a signal generation device 1518 (e.g., a speaker), a network interface device 1520, and one or more sensors (not shown), such as a GPS sensor, compass, accelerometer, or other sensor.

In some examples, the processor unit 1502 or another suitable hardware component may support a hardware interrupt. In response to a hardware interrupt, the processor unit 1502 may pause its processing and execute an ISR, for example, as described herein.

The storage device 1516 includes a machine-readable medium 1522 on which is stored one or more sets of data structures and instructions 1524 (e.g., software) embodying or utilized by any one or more of the methodologies or functions described herein. The instructions 1524 can also reside, completely or at least partially, within the main memory 1504, within the static memory 1506, and/or within the processor unit 1502 during execution thereof by the architecture 1500, with the main memory 1504, the static memory 1506, and the processor unit 1502 also constituting machine-readable media. The instructions 1524 stored at the machine-readable medium 1522 may include, for example, instructions for implementing the software architecture 1402, instructions for executing any of the features described herein, etc.

While the machine-readable medium 1522 is illustrated in an example to be a single medium, the term "machine-readable medium" can include a single medium or multiple media (e.g., a centralized or distributed database, and/or associated caches and servers) that store the one or more instructions 1524. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM) and electrically erasable programmable read-only memory (EEPROM)) and flash memory devices; magnetic disks such as internal hard disks and removable disks; magneto-optical disks; and CD-ROM and DVD-ROM disks.

The instructions 1524 can further be transmitted or received over a communications network 1526 using a transmission medium via the network interface device 1520 utilizing any one of a number of well-known transfer protocols (e.g., hypertext transfer protocol (HTTP)). Examples of communication networks include a LAN, a WAN, the Internet, mobile telephone networks, plain old telephone service (POTS) networks, and wireless data networks (e.g., Wi-Fi, 7G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 77 C.F.R. § 1.72 (b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:

1. A group management system for administering transactions between plan participants in a retirement plan, the group management system comprising:

at least one processor unit programed to perform operations comprising:

selecting a plurality of potential plan participants to be included in a participant grouping;

querying the plurality of potential plan participants for consent to be included in the participant grouping;

storing an indication of a set of plan participants that are part of the participant grouping, the set of plan participants having consented to be included in the participant grouping;

accessing public verification keys for the set of plan participants, the public verification keys for the set of plan participants comprising a public verification key for a first plan participant of the set of plan participants;

using the public verification keys for the set of plan participants to monitor transactions involving the set of plan participants at a retirement plan distributed ledger;

using the public verification key for a first plan participant of the set of plan participants to determine that a transaction for the first plan participant indicates a trigger condition for the first plan participant, the trigger condition indicating that the first plan participant has failed to make at least one scheduled contribution to a retirement plan account of the first plan participant, the transaction for the first plan participant having been added to the retirement plan distributed ledger by a second computing system distinct from the group management system;

generating an intra-group transaction, the intra-group transaction being based at least in part on the trigger condition for the first plan participant, the intra-group transaction comprising a contribution to the retirement plan account of the first plan participant from a retirement plan account of a second plan participant of the set of plan participants;

sending, via a user interface, an indication of the intra-group transaction to a computing device of the first plan participant and to a computing device of the second plan participant via a user interface;

receiving authorizations for the intra-group transaction from the computing device of the first plan participant and the computing device of the second plan participant via the user interface;

generating a transaction record describing the intra-group transaction, the generating of the transaction record comprising digitally signing the transaction record using a private verification key; and broadcasting the transaction record to be included in the retirement plan distributed ledger.

2. The group management system of claim 1, the operations further comprising before accessing the public verification keys for the set of plan participants, determining that the set of plan participants meets at least one participant grouping criterion.

3. The group management system of claim 1, the operations further comprising:

determining that respondent plan participants from the plurality of potential plan participants fail to meet at least one participant grouping criterion; and querying a plurality of supplemental plan participants for consent to be included in the participant grouping, the set of plan participants comprising at least one plan participant from the plurality of potential plan participants and at least one plan participant from the plurality of supplemental plan participants.

4. The group management system of claim 1, the intra-group transaction being a loan from at least a second plan participant to the first plan participant, the operations further comprising:

sending, to the set of plan participants, an intra-group transaction description describing the intra-group transaction; and determining that more than a threshold number of the set of plan participants have indicated consent to the intra-group transaction.

5. The group management system of claim 1, the operations further comprising:

detecting, by the group management system, a trigger condition for a second plan participant of the set of plan participants;

generating, by the group management system, a second intra-group transaction, the second intra-group transaction being based at least in part on the trigger condition for the second plan participant, the second intra-group transaction comprising a contribution to a retirement plan account of the second plan participant from at least one of the set of plan participants;

sending, to the set of plan participants, a second intra-group transaction description describing the second intra-group transaction; and upon failing to receive indications of consent to the second intra-group transaction from more than a threshold number of the set of plan participants, cancelling the second intra-group transaction.

6. The group management system of claim 1, the intra-group transaction being a loan from at least a second plan participant to the first plan participant, the operations further comprising:

using, by the group management system, a public verification key of the first plan participant and a public verification key of the second plan participant to detect a repayment transaction from the first plan participant to the second plan participant;

determining, by the group management system, that the repayment transaction offsets the intra-group transaction; and writing an indication that the intra-group transaction is closed.

7. The group management system of claim 6, the operations further comprising querying at least one of the first plan participant or the second plan participant to confirm that the repayment transaction is associated with the intra-group transaction.

8. The group management system of claim 1, the operations further comprising:

receiving, from the first plan participant, a tag request indicating a second plan participant of the set of plan participants;

using a public verification key of the second plan participant to detect a first transaction involving the second plan participant at the retirement plan distributed ledger; and sending, to the first plan participant, a description of the first transaction.

9. The group management system of claim 8, the operations further comprising, before sending the description of the first transaction to the first plan participant, sending a consent request to the second plan participant.

10. A method for administering transactions between plan participants in a retirement plan, the method comprising:

selecting, by a group management system, a plurality of potential plan participants to be included in a participant grouping;

querying, by the group management system, the plurality of potential plan participants for consent to be included in the participant grouping;

storing, by the group management system, an indication of a set of plan participants that are part of the participant grouping, the set of plan participants having consented to be included in the participant grouping;

accessing, by the group management system, public verification keys for the set of plan participants, the public verification keys for the set of plan participants comprising a public verification key for a first plan participant of the set of plan participants;

using, by the group management system, the public verification keys for the set of plan participants to monitor transactions involving the set of plan participants at a retirement plan distributed ledger;

using the public verification key for a first plan participant of the set of plan participants to determine, by the group management system, that a transaction for the first plan participant indicates a trigger condition for the first plan participant, the trigger condition indicating that the first plan participant has failed to make at least one scheduled contribution to a retirement plan account of the first plan participant, the transaction for the first plan participant having been added to the retirement plan distributed ledger by a second computing system distinct from the group management system;

generating, by the group management system, an intra-group transaction, the intra-group transaction being based at least in part on the trigger condition for the first plan participant, the intra-group transaction comprising a contribution to the retirement plan account of the first plan participant from a retirement plan account of a second plan participant of the set of plan participants;

sending, via a user interface, an indication of the intra-group transaction to a computing device of the first plan participant and to a computing device of the second plan participant via a user interface;

receiving authorizations for the intra-group transaction from the computing device of the first plan participant and the computing device of the second plan participant via the user interface;

generating a transaction record describing the intra-group transaction, the generating of the transaction record comprising digitally signing the transaction record using a private verification key; and broadcasting the transaction record to be included in the retirement plan distributed ledger.

11. The method of claim 10, further comprising before accessing the public verification keys for the set of plan participants, determining that the set of plan participants meets at least one participant grouping criterion.

12. The method of claim 10, further comprising:

determining that respondent plan participants from the plurality of potential plan participants fail to meet at least one participant grouping criterion; and querying a plurality of supplemental plan participants for consent to be included in the participant grouping, the set of plan participants comprising at least one plan participant from the plurality of potential plan participants and at least one plan participant from the plurality of supplemental plan participants.

13. The method of claim 10, the intra-group transaction being a loan from at least a second plan participant to the first plan participant, the method comprising:

sending, to the set of plan participants, an intra-group transaction description describing the intra-group transaction; and determining that more than a threshold number of the set of plan participants have indicated consent to the intra-group transaction.

14. The method of claim 10, further comprising:

detecting, by the group management system, a trigger condition for a second plan participant of the set of plan participants;

generating, by the group management system, a second intra-group transaction, the second intra-group transaction being based at least in part on the trigger condition for the second plan participant, the second intra-group transaction comprising a contribution to a retirement plan account of the second plan participant from at least one of the set of plan participants;

sending, to the set of plan participants, a second intra-group transaction description describing the second intra-group transaction; and upon failing to receive indications of consent to the second intra-group transaction from more than a threshold number of the set of plan participants, cancelling the second intra-group transaction.

15. The method of claim 10, the intra-group transaction being a loan from at least a second plan participant to the first plan participant, the method further comprising:

using, by the group management system, a public verification key of the first plan participant and a public verification key of the second plan participant to detect a repayment transaction from the first plan participant to the second plan participant;

determining, by the group management system, that the repayment transaction offsets the intra-group transaction; and writing an indication that the intra-group transaction is closed.

16. The method of claim 15, further comprising querying at least one of the first plan participant or the second plan participant to confirm that the repayment transaction is associated with the intra-group transaction.

17. The method of claim 10, further comprising:

receiving, from the first plan participant, a tag request indicating a second plan participant of the set of plan participants;

using a public verification key of the second plan participant to detect a first transaction involving the second plan participant at the retirement plan distributed ledger; and sending, to the first plan participant, a description of the first transaction.

18. The method of claim 17, further comprising, before sending the description of the first transaction to the first plan participant, sending a consent request to the second plan participant.

19. A non-transitory machine-readable medium comprising instructions thereon that, when executed by at least one processor unit, causes the at least one processor unit to perform operations comprising:

selecting a plurality of potential plan participants to be included in a participant grouping;

querying the plurality of potential plan participants for consent to be included in the participant grouping;

storing an indication of a set of plan participants that are part of the participant grouping, the set of plan participants having consented to be included in the participant grouping;

accessing public verification keys for the set of plan participants, the public verification keys for the set of plan participants comprising a public verification key for a first plan participant of the set of plan participants;

using the public verification keys for the set of plan participants to monitor transactions involving the set of plan participants at a retirement plan distributed ledger;

using the public verification key for a first plan participant of the set of plan participants to determine that a transaction for the first plan participant indicates a trigger condition for the first plan participant the trigger condition indicating that the first plan participant has failed to make at least one scheduled contribution to a retirement plan account of the first plan participant, the transaction for the first plan participant having been added to the retirement plan distributed ledger by a second computing system distinct from at least one processor unit;

generating an intra-group transaction, the intra-group transaction being based at least in part on the trigger condition for the first plan participant, the intra-group transaction comprising a contribution to retirement plan account of the first plan participant from a retirement plan account of a second plan participant of the set of plan participants;

sending, via a user interface, an indication of the intra-group transaction to a computing device of the first plan participant and to a computing device of the second plan participant via a user interface;

receiving authorizations for the intra-group transaction from the computing device of the first plan participant and the computing device of the second plan participant via the user interface;

generating a transaction record describing the intra-group transaction, the generating of the transaction record comprising digitally signing the transaction record using a private verification key; and broadcasting the transaction record to be included in the retirement plan distributed ledger.

20. The non-transitory machine-readable medium of claim 19, the operations further comprising:

receiving, from the first plan participant, a tag request indicating a second plan participant of the set of plan participants;

using a public verification key of the second plan participant to detect a first transaction involving the second plan participant at the retirement plan distributed ledger; and sending, to the first plan participant, a description of the first transaction.

* * * * *